(12) United States Patent
Zorgui et al.

(10) Patent No.: US 12,438,569 B2
(45) Date of Patent: Oct. 7, 2025

(54) FREQUENCY HOPPING ACROSS SUBBANDS WITHIN A BANDWIDTH PART

(71) Applicant: QUALCOMM Incorporated, San Diego, CA (US)

(72) Inventors: Marwen Zorgui, San Diego, CA (US); Ahmed Elshafie, San Diego, CA (US); Ahmed Attia Abotabl, San Diego, CA (US); Diana Maamari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 18/050,405

(22) Filed: Oct. 27, 2022

(65) Prior Publication Data
US 2024/0146354 A1    May 2, 2024

(51) Int. Cl.
*H04B 1/7136*    (2011.01)

(52) U.S. Cl.
CPC .................. *H04B 1/7136* (2013.01)

(58) Field of Classification Search
CPC ..... H04B 1/7136; H04B 1/7143; H04L 5/001; H04L 5/0094; H04L 5/0012; H04W 72/0453; H04W 72/23
USPC ......................................................... 375/132
See application file for complete search history.

(56) References Cited

U.S. PATENT DOCUMENTS

| | | | |
|---|---|---|---|
| 2014/0119316 A1* | 5/2014 | Linden | H04L 5/0064 370/329 |
| 2020/0106475 A1* | 4/2020 | Chen | H04W 80/02 |
| 2021/0075579 A1 | 3/2021 | Liu et al. | |

FOREIGN PATENT DOCUMENTS

WO    WO-2021168664 A1    9/2021

OTHER PUBLICATIONS

International Search Report and Written Opinion—PCT/US2023/077396—ISA/EPO—Feb. 15, 2024.

* cited by examiner

*Primary Examiner* — Fitwi Y Hailegiorgis
(74) *Attorney, Agent, or Firm* — Paul M. McAdams; Holland & Hart LLP

(57) ABSTRACT

Methods, systems, and devices for wireless communication are described. Some wireless communications systems may support frequency hopping across subbands within a configured bandwidth part (BWP). A first network node may transmit a first control message to a second network node to indicate a set of one or more frequency hopping patterns for switching between two or more subbands within the BWP configured for the second network node. The first network node may, in some aspects, transmit a second control message that is indicative of a designated frequency hopping pattern from among the set of one or more frequency hopping patterns indicated via the first control message. The first and second network nodes may communication via a first subband and a second subband of the two or more subbands in accordance with the default or designated frequency hopping pattern.

28 Claims, 18 Drawing Sheets

FREQUENCY HOPPING ACROSS SUBBANDS WITHIN A BANDWIDTH PART

INTRODUCTION

The following relates to wireless communications relating to frequency hopping across subbands within a bandwidth part (BWP). Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support frequency hopping across subbands within a bandwidth part (BWP). For example, the described techniques provide for a device to switch or hop between subbands within a BWP configured for the device in accordance with a designated frequency hopping pattern, which may improve frequency diversity, throughput, and reliability of communications. A first network node (e.g., a network entity, a base station, or some other device) may transmit, to a second network node (e.g., a user equipment (UE) or some other device), a first control message that indicates a set of one or more frequency hopping patterns for switching between two or more subbands within a BWP configured for the second network node. In some aspects, the first control message may include a radio resource control (RRC) message that configures a set of one or more grants for scheduling communications by the second network node, and the first control message may indicate a respective set of frequency hopping patterns for each grant. In some aspects, the first control message may indicate a default frequency hopping pattern, and the first and second network nodes may communicate via at least two subbands within the BWP in accordance with the default frequency hopping pattern.

Additionally, or alternatively, the first network node may transmit a second control message that indicates a designated frequency hopping pattern from among the set of one or more frequency hopping patterns indicated via the first control message. The first and second network nodes may communicate via at least two subbands within the BWP in accordance with the designated frequency hopping pattern indicated via the second control message. The first network node may thereby indicate a frequency hopping pattern for communicating via two or more subbands within a BWP, which may provide for the second network node to support a reduced bandwidth while maintaining frequency diversity by switching between subbands according to the frequency hopping pattern.

A method for wireless communication at a first network node is described. The method may include receiving a first control message that indicates a set of one or more frequency hopping patterns for switching between two or more subbands within a BWP configured for the first network node and communicating via a first subband of the two or more subbands and via a second subband of the two or more subbands in accordance with a designated frequency hopping pattern from among the set of one or more frequency hopping patterns.

A first network node for wireless communication is described. The first network node may include a memory and at least one processor coupled to the memory. The at least one processor may be configured to receive a first control message that indicates a set of one or more frequency hopping patterns for switching between two or more subbands within a BWP configured for the first network node and communicate via a first subband of the two or more subbands and via a second subband of the two or more subbands in accordance with a designated frequency hopping pattern from among the set of one or more frequency hopping patterns.

Another apparatus for wireless communication at a first network node is described. The apparatus may include means for receiving a first control message that indicates a set of one or more frequency hopping patterns for switching between two or more subbands within a BWP configured for the first network node and means for communicating via a first subband of the two or more subbands and via a second subband of the two or more subbands in accordance with a designated frequency hopping pattern from among the set of one or more frequency hopping patterns.

A non-transitory computer-readable medium storing code for wireless communication at a first network node is described. The code may include instructions executable by a processor to receive a first control message that indicates a set of one or more frequency hopping patterns for switching between two or more subbands within a BWP configured for the first network node and communicate via a first subband of the two or more subbands and via a second subband of the two or more subbands in accordance with a designated frequency hopping pattern from among the set of one or more frequency hopping patterns.

Some examples of the method, apparatuses, and non-transitory computer-readable medium described herein may further include operations, features, means, or instructions for receiving a second control message that may be indicative of the designated frequency hopping pattern from among the set of one or more frequency hopping patterns indicated via the first control message.

In some examples of the method, apparatuses, and non-transitory computer-readable medium described herein, communicating via the first subband and the second subband may include operations, features, means, or instructions for communicating via the first subband for a first time period and communicating, based on a switch from the first subband to the second subband in accordance with the designated frequency hopping pattern, via the second subband for a second time period, where the designated frequency hopping pattern indicates the first time period for communicating via the first subband, the second time period for communicating via the second subband, and an order for switching between the first subband and the second subband.

In some examples of the method, apparatuses, and non-transitory computer-readable medium described herein, communicating via the first subband and the second subband may include operations, features, means, or instructions for communicating via the first subband for a first quantity of transmission occasions based on a first periodicity associated with the first subband and communicating, based on a switch from the first subband to the second subband in accordance with the designated frequency hopping pattern, via the second subband for a second quantity of transmission occasions based on a second periodicity associated with the second subband, where the first control message configures a respective periodicity for each subband of the two or more subbands within the BWP, and where the designated frequency hopping pattern indicates the first periodicity, the second periodicity, and an order for switching between the first subband and the second subband.

Some examples of the method, apparatuses, and non-transitory computer-readable medium described herein may further include operations, features, means, or instructions for receiving, via the first control message, a set of multiple grant configurations, where each grant configuration of the set of multiple grant configurations indicates a frequency domain allocation of a respective subband of the two or more subbands within the BWP and a time period associated with the respective grant configuration, and where each frequency hopping pattern of the set of one or more frequency hopping patterns indicates a respective order for switching between individual subbands of the two or more subbands in accordance with respective grant configurations corresponding to the individual subbands.

In some examples of the method, apparatuses, and non-transitory computer-readable medium described herein, communicating via the first subband and the second subband may include operations, features, means, or instructions for communicating via the first subband for a first quantity of transmission occasions based on a first grant configuration of the set of multiple grant configurations associated with the first subband and communicating, based on a switch from the first subband to the second subband in accordance with the designated frequency hopping pattern, via the second subband for a second quantity of transmission occasions based on a second grant configuration of the set of multiple grant configurations associated with the second subband.

In some examples of the method, apparatuses, and non-transitory computer-readable medium described herein, the switch may be based on respective time periods associated with the first grant configuration and the second grant configuration, based on reception of downlink control information (DCI) that activates the second grant configuration, or both.

Some examples of the method, apparatuses, and non-transitory computer-readable medium described herein may further include operations, features, means, or instructions for receiving, via the first control message, a mapping between each frequency hopping pattern of the set of one or more frequency hopping patterns and a respective subband of the two or more subbands and receiving a second control message via a subband of the two or more subbands, where the second control message may be indicative of the designated frequency hopping pattern based on the subband of the two or more subbands on which the second control message may be received and based on the mapping.

Some examples of the method, apparatuses, and non-transitory computer-readable medium described herein may further include operations, features, means, or instructions for receiving, via the first control message, an indication of a subset of subbands of a set of multiple subbands within the BWP configured for the first network node, where the first control message indicates that frequency hopping may be activated within the subset of subbands and deactivated within remaining subbands of the set of multiple subbands of the BWP.

In some examples of the method, apparatuses, and non-transitory computer-readable medium described herein, receiving the first control message may include operations, features, means, or instructions for receiving, as the first control message, a RRC message that configures a set of one or more grants for scheduling communications by the first network node and indicates a respective set of one or more frequency hopping patterns for each grant of the set of one or more grants.

In some examples of the method, apparatuses, and non-transitory computer-readable medium described herein, the RRC message indicates the designated frequency hopping pattern.

Some examples of the method, apparatuses, and non-transitory computer-readable medium described herein may further include operations, features, means, or instructions for receiving a medium access control-control element (MAC-CE) that indicates a grant of the set of one or more grants and the designated frequency hopping pattern from among a set of one or more frequency hopping patterns associated with the grant, where the designated frequency hopping pattern may be different than a default frequency hopping pattern indicated by the first control message and communicating via at least two subbands of the two or more subbands in accordance with the designated frequency hopping pattern after a switch from the default frequency hopping pattern to the designated frequency hopping pattern based on the MAC-CE.

Some examples of the method, apparatuses, and non-transitory computer-readable medium described herein may further include operations, features, means, or instructions for receiving DCI that activates a grant of the set of one or more grants and indicates the designated frequency hopping pattern from among the respective set of frequency hopping patterns indicated via the RRC message.

Some examples of the method, apparatuses, and non-transitory computer-readable medium described herein may further include operations, features, means, or instructions for receiving a MAC-CE that indicates a subset of frequency hopping patterns from among the respective sets of one or more frequency hopping patterns indicated via the RRC message, where the DCI indicates the designated frequency hopping pattern from among the subset of frequency hopping patterns indicated via the MAC-CE.

In some examples of the method, apparatuses, and non-transitory computer-readable medium described herein, the set of one or more grants includes configured grants, semi-persistent scheduling (SPS) grants, DCI grants for uplink shared channels, DCI grants for downlink shared channels, or any combination thereof.

A method for wireless communication at a first network node is described. The method may include transmitting a first control message that indicates a set of one or more frequency hopping patterns for switching between two or more subbands within a BWP configured for a second network node in communication with the first network node and communicating via a first subband of the two or more subbands and via a second subband of the two or more subbands in accordance with a designated frequency hopping pattern from among the set of one or more frequency hopping patterns.

A first network node for wireless communication is described. The first network node may include a memory and at least one processor coupled to the memory. The at least one processor may be configured to transmit a first control message that indicates a set of one or more frequency hopping patterns for switching between two or more subbands within a BWP configured for a second network node in communication with the first network node and communicate via a first subband of the two or more subbands and via a second subband of the two or more subbands in accordance with a designated frequency hopping pattern from among the set of one or more frequency hopping patterns.

Another apparatus for wireless communication at a first network node is described. The apparatus may include means for transmitting a first control message that indicates a set of one or more frequency hopping patterns for switching between two or more subbands within a BWP configured for a second network node in communication with the first network node and means for communicating via a first subband of the two or more subbands and via a second subband of the two or more subbands in accordance with a designated frequency hopping pattern from among the set of one or more frequency hopping patterns.

A non-transitory computer-readable medium storing code for wireless communication at a first network node is described. The code may include instructions executable by a processor to transmit a first control message that indicates a set of one or more frequency hopping patterns for switching between two or more subbands within a BWP configured for a second network node in communication with the first network node and communicate via a first subband of the two or more subbands and via a second subband of the two or more subbands in accordance with a designated frequency hopping pattern from among the set of one or more frequency hopping patterns.

Some examples of the method, apparatuses, and non-transitory computer-readable medium described herein may further include operations, features, means, or instructions for transmitting a second control message that may be indicative of the designated frequency hopping pattern from among the set of one or more frequency hopping patterns indicated via the first control message.

In some examples of the method, apparatuses, and non-transitory computer-readable medium described herein, communicating via the first subband and the second subband may include operations, features, means, or instructions for communicating via the first subband for a first time period and communicating, based on a switch from the first subband to the second subband in accordance with the designated frequency hopping pattern, via the second subband for a second time period, where the designated frequency hopping pattern indicates the first time period for communicating via the first subband, the second time period for communicating via the second subband, and an order for switching between the first subband and the second subband.

In some examples of the method, apparatuses, and non-transitory computer-readable medium described herein, communicating via the first subband and the second subband may include operations, features, means, or instructions for communicating via the first subband for a first quantity of transmission occasions based on a first periodicity associated with the first subband and communicating, based on a switch from the first subband to the second subband in accordance with the designated frequency hopping pattern, via the second subband for a second quantity of transmission occasions based on a second periodicity associated with the second subband, where the first control message configures a respective periodicity for each subband of the two or more subbands within the BWP, and where the designated frequency hopping pattern indicates the first periodicity, the second periodicity, and an order for switching between the first subband and the second subband.

Some examples of the method, apparatuses, and non-transitory computer-readable medium described herein may further include operations, features, means, or instructions for transmitting, via the first control message, a set of multiple grant configurations, where each grant configuration of the set of multiple grant configurations indicates a frequency domain allocation of a respective subband of the two or more subbands within the BWP and a time period associated with the respective grant configuration, and where each frequency hopping pattern of the set of one or more frequency hopping patterns indicates a respective order for switching between individual subbands of the two or more subbands in accordance with respective grant configurations corresponding to the individual subbands.

In some examples of the method, apparatuses, and non-transitory computer-readable medium described herein, communicating via the first subband and the second subband may include operations, features, means, or instructions for communicating via the first subband for a first quantity of transmission occasions based on a first grant configuration of the set of multiple grant configurations associated with the first subband and communicating, based on a switch from the first subband to the second subband in accordance with the designated frequency hopping pattern, via the second subband for a second quantity of transmission occasions based on a second grant configuration of the set of multiple grant configurations associated with the second subband.

Some examples of the method, apparatuses, and non-transitory computer-readable medium described herein may further include operations, features, means, or instructions for transmitting, via the first control message, a mapping between each frequency hopping pattern of the set of one or more frequency hopping patterns and a respective subband of the two or more subbands and transmitting a second control message via a subband of the two or more subbands, where the second control message may be indicative of the designated frequency hopping pattern based on the subband of the two or more subbands on which the second control message may be transmitted and based on the mapping.

Some examples of the method, apparatuses, and non-transitory computer-readable medium described herein may further include operations, features, means, or instructions for transmitting, via the first control message, an indication of a subset of subbands of a set of multiple subbands within the BWP, where the first control message indicates that frequency hopping may be activated within the subset of subbands and deactivated within remaining subbands of the set of multiple subbands of the BWP.

In some examples of the method, apparatuses, and non-transitory computer-readable medium described herein, transmitting the first control message may include operations, features, means, or instructions for transmitting, as the first control message, a RRC message that configures a set of one or more grants for scheduling communications by the first network node and indicates a respective set of one or more frequency hopping patterns for each grant of the set of one or more grants.

In some examples of the method, apparatuses, and non-transitory computer-readable medium described herein, the RRC message indicates the designated frequency hopping pattern.

Some examples of the method, apparatuses, and non-transitory computer-readable medium described herein may further include operations, features, means, or instructions for transmitting a MAC-CE that indicates a grant of the set of one or more grants and the designated frequency hopping pattern from among a set of one or more frequency hopping patterns associated with the grant, where the designated frequency hopping pattern may be different than a default frequency hopping pattern indicated by the first control message and communicating via at least two subbands of the two or more subbands in accordance with the designated frequency hopping pattern after a switch from the default frequency hopping pattern to the designated frequency hopping pattern based on the MAC-CE.

Some examples of the method, apparatuses, and non-transitory computer-readable medium described herein may further include operations, features, means, or instructions for transmitting DCI that activates a grant of the set of one or more grants and indicates the designated frequency hopping pattern from among the respective set of frequency hopping patterns indicated via the RRC message.

Some examples of the method, apparatuses, and non-transitory computer-readable medium described herein may further include operations, features, means, or instructions for transmitting a MAC-CE that indicates a subset of frequency hopping patterns from among the respective sets of one or more frequency hopping patterns indicated via the RRC message, where the DCI indicates the designated frequency hopping pattern from among the subset of frequency hopping patterns indicated via the MAC-CE.

DETAILED DESCRIPTION

Figure 1:
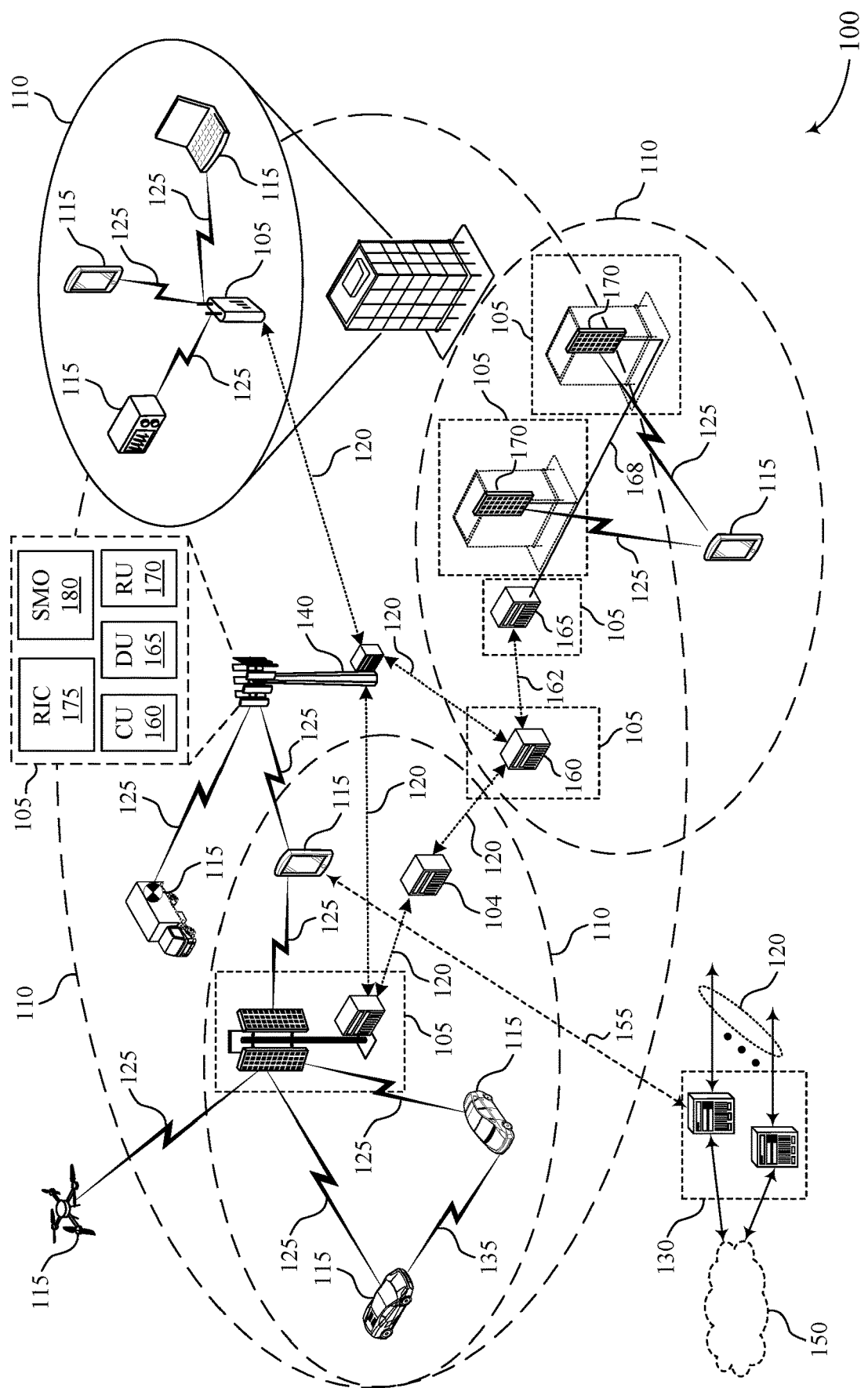
FIG. 1 illustrates an example of a wireless communications system that supports frequency hopping across subbands within a bandwidth part (BWP) in accordance with one or more aspects of the present disclosure.

Some wireless communications systems may support device communication within a system bandwidth part (BWP) (e.g., a 20 megahertz (MHz) BWP, or some other BWP size). However, some devices, such as reduced capability or an enhanced reduced capability device (e.g., an eRedCap user equipment (UE)), in the wireless communications system may be configured with a reduced baseband bandwidth within the system BWP. For example, the system BWP may be applicable to the device, meaning that the device may be able to communicate using the entirety of the BWP, but not at the same time. The device may support communications within a single subband of the system BWP at any given moment in time. In one aspect, the system BWP may be 20 MHz and the baseband bandwidth for the device may be up to 5 MHz, or some other relative sizes. Such devices may not support frequency hopping across BWPs, which may reduce frequency diversity of communications.

Techniques, systems, and devices described herein provide for a first network node to configure a frequency hopping pattern that indicates a pattern for a second network node to switch between subbands within a system BWP for communications. The first network node and the second network node may represent examples of network entities, UEs, or some other devices that communicate via a wireless communication link. By switching between subbands within the BWP in accordance with the frequency hopping pattern, the second network node may communicate within a single subband at a time (e.g., a reduced bandwidth) while improving or maintaining frequency diversity, throughput, and reliability of communications. The frequency hopping patterns may indicate an order of subband hopping to be used during the frequency hopping, a time duration for communicating via each subband, a periodicity associated with switching between the subbands, or any combination thereof.

The first network node may transmit one or more control messages to configure or activate the frequency hopping pattern. For example, the first network node may transmit a first control message to configure a set of one or more frequency hopping patterns that may be available for use by the second network node. The first control message may configure a set of grants for scheduling communications with the second network node, such as configured grants, semi-persistent scheduling (SPS) grants, downlink control information (DCI) grants, or any combination thereof. The first control message may indicate a respective set of one or more frequency hopping patterns associated with each grant configuration. In some aspects, the first control message may indicate a default frequency hopping pattern, and the second network node may communicate in accordance with the default frequency hopping pattern. Additionally, or alternatively, the first network node may transmit a second control message that indicates a designated frequency hopping pattern from among the one or more frequency hopping patterns indicated via the first control message.

The described techniques may be applied for different types of uplink and downlink communications, including communications scheduled by configured grants (e.g., type 1 or type 2), SPS scheduling, and activation DCI. The first control message may be a radio resource control (RRC) message that configures the configured grants or SPS and the set of multiple frequency hopping patterns, and the second control message may be a medium access control-control element (MAC-CE) or activation DCI, in some aspects. The first network node may thereby indicate a frequency hopping pattern for communicating via two or more subbands within a BWP, which may provide for the second network node to support a reduced bandwidth while maintaining frequency diversity by switching between subbands according to the frequency hopping pattern.

Aspects of the disclosure are initially described in the context of wireless communications systems. Additional aspects are described with reference to frequency hopping patterns and a process flow. Aspects of the disclosure are further illustrated by and described with reference to apparatus diagrams, system diagrams, and flowcharts that relate to frequency hopping across subbands within a BWP.

FIG. 1 illustrates an example of a wireless communications system 100 that supports frequency hopping across subbands within a BWP in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various aspects, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other aspects or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support frequency hopping across subbands within a BWP as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other aspects. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other aspects.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other aspects.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other aspects, the device may provide HARQ feedback in a subsequent slot, or according to some other time interval.

Techniques, systems, and devices described herein provide for one or more devices in the wireless communications system 100 may switch or hop between subbands within a BWP configured for the device in accordance with a designated frequency hopping pattern, which may improve frequency diversity, throughput, and reliability of communications. A first network node (e.g., a network entity 105, a base station 140, or some other device) may transmit, to a second network node (e.g., a UE 115 or some other device), a first control message that indicates a set of one or more frequency hopping patterns for switching between two or more subbands within a BWP configured for the second network node. In some aspects, the first control message may include an RRC message that configures a set of one or more grants for scheduling communications by the second network node, and the first control message may indicate a respective set of frequency hopping patterns for each grant. In some aspects, the first control message may indicate a default frequency hopping pattern, and the first and second network nodes may communicate via at least two subbands within the BWP in accordance with the default frequency hopping pattern.

Additionally, or alternatively, the first network node may transmit a second control message that indicates a designated frequency hopping pattern from among the set of one or more frequency hopping patterns indicated via the first control message. The first and second network nodes may communicate via at least two subbands within the BWP in accordance with the designated frequency hopping pattern indicated via the second control message. The first network node may thereby indicate a frequency hopping pattern for communicating via two or more subbands within a BWP, which may provide for the second network node to support a reduced bandwidth while maintaining frequency diversity by switching between subbands according to the frequency hopping pattern.

Figure 2:
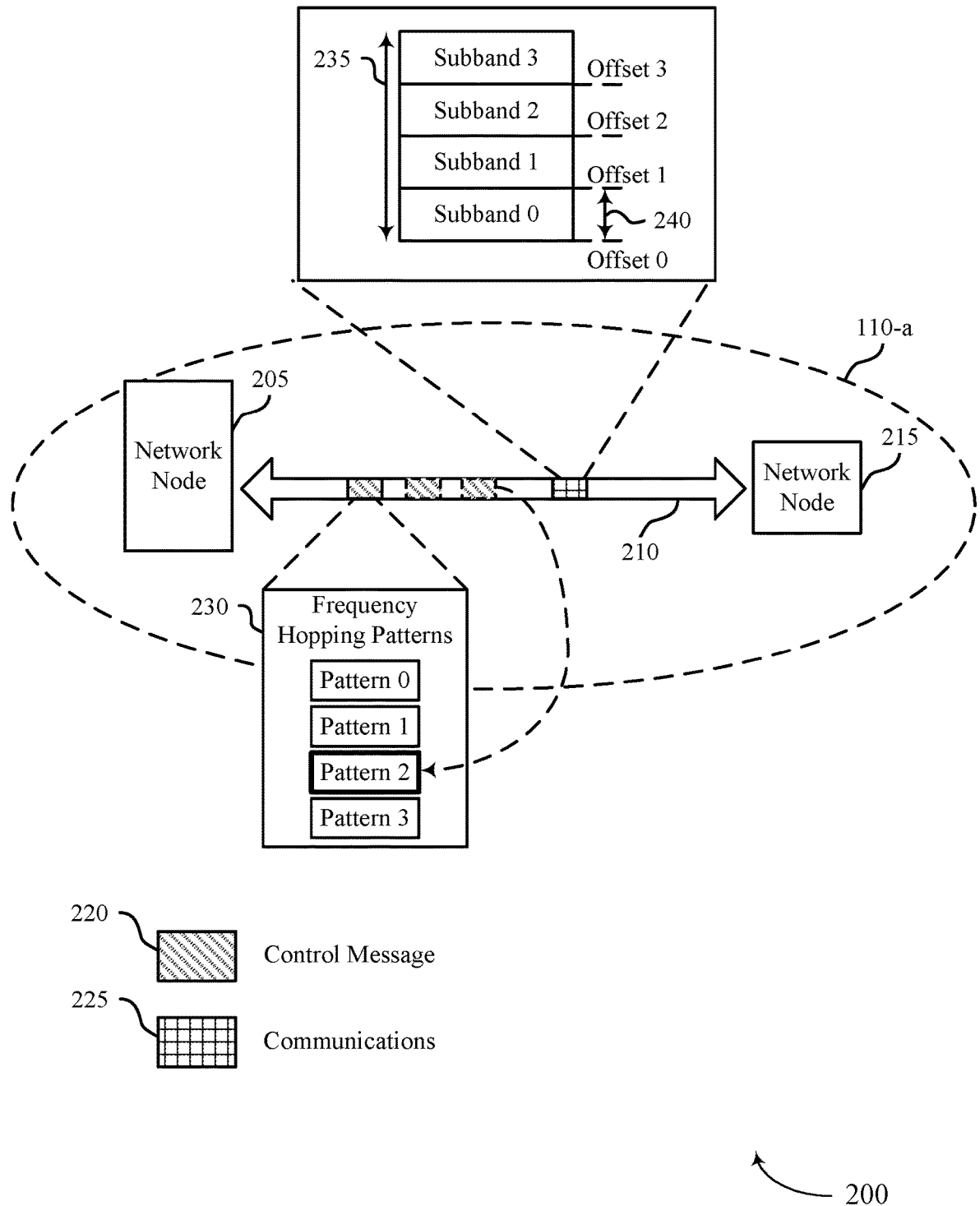
FIG. 2 illustrates an example of a wireless communications system that supports frequency hopping across subbands within a BWP in accordance with one or more aspects of the present disclosure.

FIG. 2 illustrates an example of a wireless communications system 200 that supports frequency hopping across subbands within a BWP in accordance with one or more aspects of the present disclosure. The wireless communications system 200 may implement or be implemented by aspects of the wireless communications system 100 as described with reference to FIG. 1. For example, the wireless communications system 200 may include a network node 205 and a network node 215, which may represent examples of a network entity 105 and a UE 115, or some other devices, as described with reference to FIG. 1. The network node 205 may communicate with the network node 215 within a geographic coverage area 110-a and via a communication link 210 (e.g., a Uu link). In this example, the network node 205 may indicate a set of frequency hopping patterns 230 to the network node 215, and the network node 215 may use at least one of the frequency hopping patterns 230 to switch between subbands 240 within a system BWP 235.

Devices in the wireless communications system 200 may support a range of different device capabilities. In some aspects, a device may support reduced capabilities to reduce power consumption and complexity. Devices that operate under reduced capabilities may be referred to as RedCap (e.g., NR light) devices, or enhanced RedCap (eRedCap) (e.g., NR-superlight) devices. Examples of such devices may include wearable devices, wireless sensors, health monitors, reduced quality smart phones, parking sensors, utility meters, asset trackers, or other devices (e.g., devices that support IoT, massive IoT, or low-power wide-area (LPWA) systems, among other examples).

Various communication parameters may vary across different devices that operate in accordance with different capability levels. For example, a quantity of types of duplexing modes, a quantity of MIMO layers, a peak data rate, a quantity of antenna elements, a channel coding type, a maximum modulation order, a maximum coupling loss (MCL), other parameters, or any combination thereof that are supported by the device may change as the device capability changes. Additionally, or alternatively, a bandwidth that is supported by the device may decrease as capabilities of the device decrease.

To support reduced complexity, an eRedCap UE, for example, may support communications via a bandwidth that is less than a bandwidth supported by another UE that is not an eRedCap UE. The other UE may monitor for communications within a system BWP 235, and the eRedCap UE may monitor a single subband 240 within the system BWP 235 at a time. The subband 240 may span over a frequency range that is less than a frequency range of the system BWP 235 (e.g., a 5 MHz subband 240 within a 20 MHz system BWP 235 in FR1, or some other frequency range sizes). The reduced bandwidth operation may apply with or without synchronization signal blocks (SSBs) and with or without radio frequency (RF) retuning. In some aspects, the eRedCap UE may additionally, or alternatively, support a relaxed processing timeline for uplink or downlink channels or channel state information (CSI), a reduced peak data rate (e.g., in FR1), a reduced or restricted bandwidth for downlink or uplink shared channels, or any combination thereof.

In some aspects, a BWP 235 may be configured for uplink or downlink communications by devices in the wireless communications system 200 (e.g., a 20 MHz or 100 MHz BWP in FR1, or some other frequency range). Some devices may communicate within a single BWP 235 at a time, and may switch between different BWPs 235 over time to achieve frequency diversity. A frequency domain resource allocation (FDRA) for the system BWP 235 may start from a first physical resource block (PRB) within the system BWP 235 (e.g., a first frequency resource in the frequency domain) and may span across some quantity of PRBs in the frequency domain. In the example of the wireless communications system 200, the network node 215 may support a reduced (e.g., restricted or limited) bandwidth as compared with some other network nodes 215 (not pictured in FIG. 2). That is, the system BWP 235 may be applicable to the network node 215, but the network node 215 may support a baseband bandwidth (e.g., one subband 240) that is a subset of the system BWP 235 at a time (e.g., to reduce a peak data rate or buffer size for the network node 215).

Techniques, systems, and devices described herein provide for the network node 215 to support communications via a single subband 240 at a time and to switch between different subbands 240 within the system BWP 235 over time to achieve frequency diversity. For example, the BWP 235 may be divided into one or more subbands 240 (e.g., Subband 0, Subband 1, Subband 2, and Subband 3 in FIG. 2). Each subband 240 may span a frequency range that is approximately the same as each other subband 240. The frequency range of the subband 240 may be less than or equal to a frequency range (e.g., a quantity of resource blocks, $N_{RB}$) that is supported by the network node 215 at a time (e.g., 5 MHz, or some other baseband bandwidth). The network node 215 may switch between subbands 240 for communications over time, which may provide for the network node 215 to improve frequency diversity, thereby increasing throughput and reliability of communications.

A starting point for the subbands 240 may be determined with respect to a first PRB of the BWP 235 (e.g., PRB0) and may be based on a subcarrier spacing (SCS) configured for the BWP 235. An offset of each subband 240 (e.g., Offsets 0 through 3 in FIG. 2) may be determined based on the maximum bandwidth supported by the network node 215, $N_{RB}$. For example, an offset k may be positioned at $k*N_{RB}$ resource blocks from the first resource block in the BWP 235, where $N_{RB}$ may represent a quantity of resource blocks that are included in a baseband bandwidth of the network node 215. Each subband 240 may be valid if the subband 240 contains a quantity of resource blocks that is equal to or less than $N_{RB}$. To communicate within a given subband 240, the FDRA for downlink reception or uplink transmission by the network node 215 may start in a first resource block in a valid subband 240. For example, an FDRA for communications 225 via the subband 1 illustrated in FIG. 2 may begin in a first resource block at the offset 1 in the frequency domain.

The network node 205 may schedule the communications 225 with the network node 215. The communications 225 may include uplink transmissions by the network node 215, downlink transmissions by the network node 205, or both. A type of scheduling grant used by the network node 205 may include a configured grant (e.g., configured grant type 1 or configured grant type 2), semi-persistent scheduling (SPS), dynamic activation DCI for shared channels (e.g., multiple physical downlink shared channels (PDSCHs) or physical uplink shared channels (PUSCHs)), or any combination thereof. The network node 205 may transmit a first control message 220 that configures the grants. For example, for type 1 and type 2 configured grants, the control message 220 may be transmitted as an RRC configuration that configures the uplink or downlink grants per service cell and per BWP 235. For type 1 configured grants, the RRC configuration may define a grant configuration. For type 2 configured grants, the network node 205 may transmit a second control message 220, such as DCI, that may activate a subset of one or more of the grant configurations.

As described herein, the first control message 220 transmitted by the network node 205 may additionally, or alternatively, indicate a set of one or more frequency hopping patterns 230 associated with each of the grant configurations. For example, the first control message 220 may indicate a first set of frequency hopping patterns 230 associated with a first grant configuration, a second set of frequency hopping patterns associated with a second grant configuration, and the like. Each frequency hopping pattern 230 (e.g., patterns 0-3 illustrated in FIG. 2) may define or indicate a respective set of frequency hopping parameters for the network nodes to follow when communicating. For example, each frequency hopping pattern 230 may indicate an order of subbands 240, a time period or periodicity for switching between subbands 240, other frequency hopping parameters, or any combination thereof. Example frequency hopping patterns are defined and described in further detail elsewhere herein, including with reference to FIGS. 3A and 3B.

In some aspects (e.g., for type 1 configured grant or SPS communications), the first control message 220 transmitted by the network node 205 may activate or configure one of the grants for the network node 215 to use. In such cases, the first control message 220 may indicate a default frequency hopping pattern 230 from among the set of frequency hopping patterns 230 associated with the activated grant. For example, if the activated grant is associated with the patterns 0-3, the first control message 220 may indicate that the default pattern is pattern 0. The network node 205 may receive the first control message 220 and transmit or receive the communications 225 in accordance with the default frequency hopping pattern 230 for at least a time period.

The network node 215 may communicate in accordance with the default frequency hopping pattern 230 until a subsequent grant is activated. Additionally, or alternatively, the network node 205 may transmit a second control message 220 (e.g., a MAC-CE) that indicates or activates a designated frequency hopping pattern 230 different than the default frequency hopping pattern. For example, if the default pattern is pattern 0, the second control message 220 may activate the pattern 2. In such cases, the network node 215 may switch from communicating in accordance with the default frequency hopping pattern 230 to communicating in accordance with the designated frequency hopping pattern 230 in response to the second control message 220.

In some other aspects (e.g., type 2 configured grant or SPS communications, or communications in which an activation DCI schedules multiple shared channels), the first control message may configure the grant configurations and the network node 205 may transmit a second control message 220 to activate one of the grant configurations. In such cases, the first control message 220 may indicate a respective set of one or more frequency hopping patterns 230 associated with each grant, and the second control message 220 may activate a grant configuration and indicate a designated frequency hopping pattern from among a set of one or more frequency hopping patterns 230 associated with the grant configuration. The second control message 220 may include or be transmitted as DCI (e.g., an activation DCI). In some aspects, the network node 205 may transmit a third control message 220 after the first control message 220 and before the second control message 220. The third control message 220 may include or be transmitted as a MAC-CE, for example. The third control message 220 may select or indicate a subset of frequency hopping patterns 230 from among the set of frequency hopping patterns 230 indicated via the first control message 220, and the second control message 220 may then indicate one of the frequency hopping patterns 230 from the subset indicated via the MAC-CE.

Devices as described herein may thereby support a reduced bandwidth (e.g., a subband 240 within a system BWP 235) while maintaining relatively high frequency diversity, throughput, and communication reliability by switching between subbands 240 within a BWP 235 over time in accordance with a designated or defined frequency hopping pattern. By transmitting one or more control messages 220 to indicate a designated frequency hopping pattern, the network node 205 may improve coordination between the devices while supporting the frequency hopping techniques described herein. The network node 215 may transmit and/or receive the communications 225 over time in accordance with one or more grants (e.g., SPS grants, configured grants, or activation DCI that schedules one or more shared channel transmissions) across different subbands 240 based on the frequency hopping pattern 230.

Figure 3A:
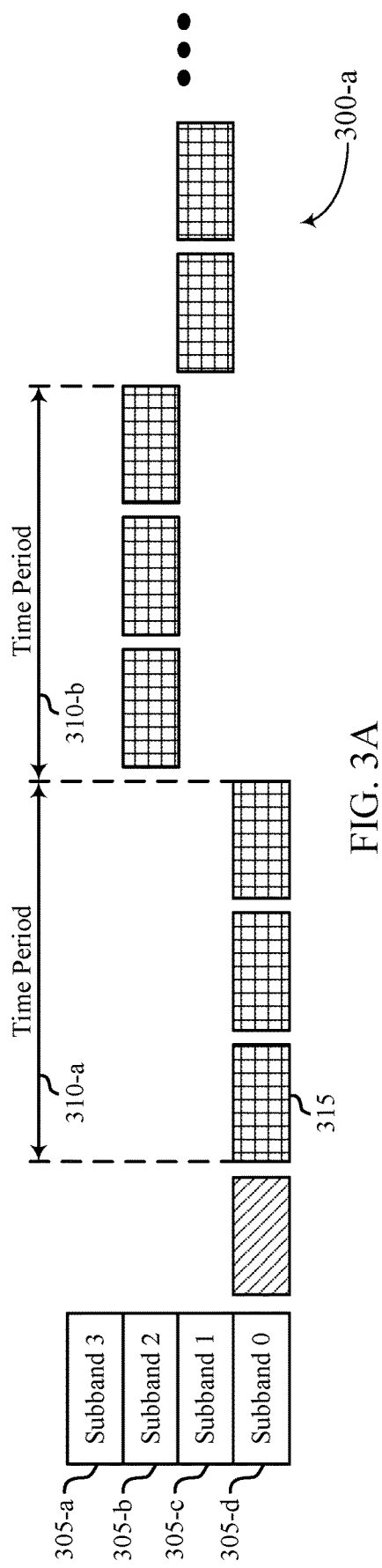
FIGS. 3A and 3B illustrate examples of frequency hopping patterns that supports frequency hopping across subbands within a BWP in accordance with one or more aspects of the present disclosure.
Figure 3B:
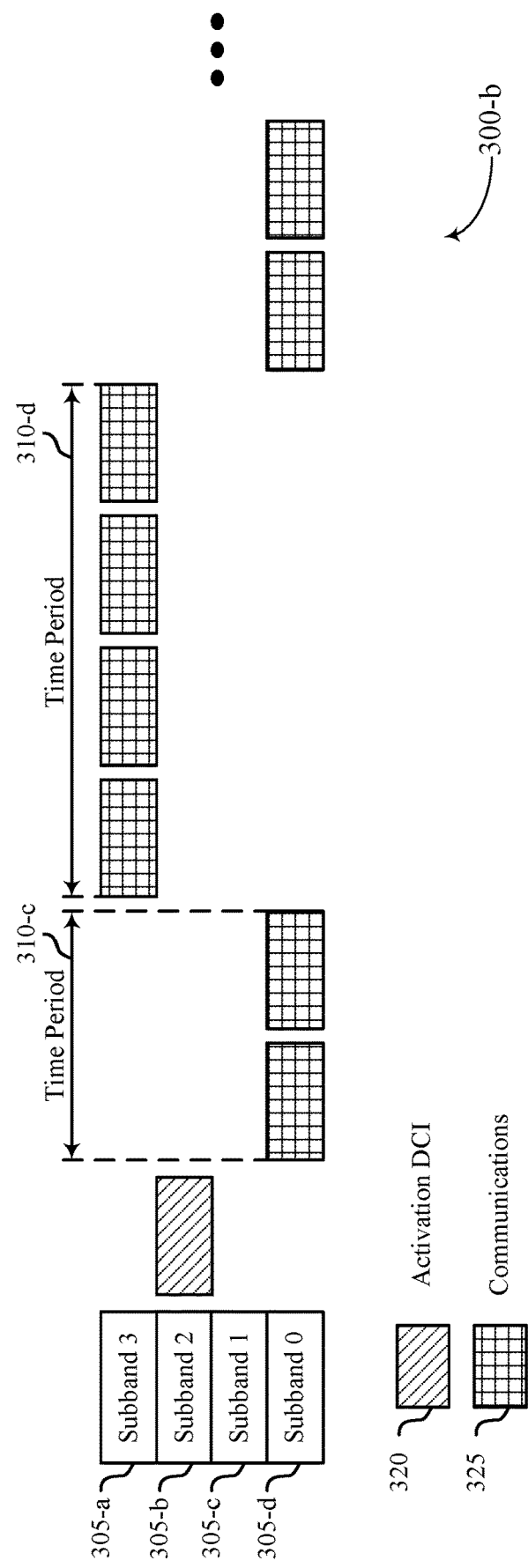

FIGS. 3A and 3B illustrate examples of frequency hopping patterns 300 that support frequency hopping across subbands within a BWP in accordance with one or more aspects of the present disclosure. In some aspects, the frequency hopping patterns 300-a and 300-b may implement aspects of the wireless communications systems 100 or 200. For example, a first network node and a second network node (e.g., a UE, a network entity, or some other node) may switch between subbands 305 within a BWP in accordance with the frequency hopping patterns 300. The network nodes may perform communications 325 via each subband 305 over time based on the pattern. In this example, the horizontal or X-axis may represent time and the vertical or Y-axis may represent frequency.

In some aspects, the communications 325 may be scheduled or allocated based on one or more grants, such as SPS grants, configured grants, dynamic activation DCI, or any combination thereof, as described with reference to FIG. 2. The boxes of communications 325 illustrated in FIGS. 3A and 3B may each represent a respective transmission occasion 315 (e.g., an SPS occasion or a configured grant occasion, which may be referred to as an uplink or downlink shared channel occasion). Although illustrated as separate boxes in FIGS. 3A and 3B, it is to be understood that the network nodes may perform communications 325 (e.g., uplink, downlink, or both) via continuous or discontinuous time and frequency resources, in some aspects.

In this example, although not illustrated for clarity, the subbands 305-a, 305-b, 305-c, and 305-d may be included in a BWP configured for communications by a second network node. For example, the subbands 305 (e.g., subbands 305-a through 305-d) may represent examples of the subbands 240 within a BWP 235, as described with reference to FIG. 2. The subbands 305 may represent frequency bands that span a range of frequencies based on a bandwidth supported by the second network node, as described in further detail with reference to FIG. 2.

To achieve frequency diversity while supporting a reduced bandwidth (e.g., a single subband 305), a second network node as described herein may hop or switch between subbands 305 within a BWP over time. Techniques, systems, and devices described herein provide for a first network node (e.g., a network entity) to configure a set of one or more frequency hopping patterns 300 for the second network node (e.g., a UE). The first network node may indicate a designated frequency hopping pattern from among the set for the first network node to use for communications. As described in further detail with reference to FIG. 2, the first network node may indicate the designated frequency hopping pattern via one or more control messages.

Each frequency hopping pattern may correspond to a pattern for the first and second network nodes to switch between subbands 305 over time and may be defined by or associated with a respective set of frequency hopping parameters. The frequency hopping parameters may include, for example, a time duration associated with each subband 305, a periodicity associated with each subband 305, an order of subbands 305, other parameters, or any combination thereof.

FIG. 3A illustrates an example frequency hopping pattern 300-a that supports frequency hopping across subbands within a BWP in accordance with one or more aspects of the present disclosure. The frequency hopping pattern 300-a illustrates a pattern for a network node to switch between at least the subbands 305-d, 305-b, and 305-c over time. An subband hopping order associated with the frequency hopping pattern may correspond to: Subband 0, Subband 2, Subband 1. In some aspects, the pattern may continue in time to include repetition of a subband or another subband, such as Subband 3, or the pattern may repeat over time for some quantity of periods or repetitions.

In some aspects, each frequency hopping pattern 300 configured by a first network node, including the frequency hopping pattern 300-a, may be associated with one or more defined time durations (e.g., time units or quantities of transmission occasions 315) on which frequency usage is fixed before a new subband 305 is selected. In the example of FIG. 3A, the time duration for the frequency hopping pattern 300-a may be represented by the time period 310-a and the time period 310-b, which may be associated with a same duration, in this aspect. The frequency hopping pattern 300-a may be associated with a time period 310 of approximately three transmission occasions 315 before switching between subbands 305 in accordance with the subband hopping order defined for the frequency hopping pattern 300-a. Additionally, or alternatively, the time periods 310-a and 310-b may be defined in units of time (e.g., milliseconds, or some other unit).

In the example of FIG. 3A, if the frequency hopping pattern 300-a is associated with a defined time period 310 of three transmission occasions 315, the network node may perform the communications 325 (e.g., uplink or downlink transmissions or receptions) during three transmission occasions 315 on the subband 305-d before switching to the subband 305-b. After the switch to the subband 305-b, the network node may perform the communications 325 during three transmission occasions 315 on the subband 305-b before switching to the subband 305-c, and so on in accordance with the order indicated by the frequency hopping pattern 300-a.

FIG. 3B illustrates a second example frequency hopping pattern 300-b that supports frequency hopping across subbands within a BWP in accordance with one or more aspects of the present disclosure. The frequency hopping pattern 300-b illustrates a pattern for a network node to switch between at least the subbands 305-d and 305-a over time. A subband hopping order associated with the frequency hopping pattern 300-b may correspond to: Subband 0, Subband 3. In some aspects, the pattern may continue in time to include repetition of a subband 305 or to include another subband 305, such as Subbands 1 and 2, or the pattern may repeat over time for some quantity of periods or repetitions.

In some aspects, a frequency hopping pattern 300 may define or be associated with a different periodicity for grants across each subband 305. For example, as illustrated in FIG. 3B, a first time period 310-c associated with the subband 305-d may be different than a second time period 310-d associated with the subband 305-a, where the time periods 310-c and 310-d may represent periodicities associated with the subbands 305-d and 305-a, respectively. A network node may perform communications 325 via each subband 305 in accordance with the respective periodicity before switching to the next subband 305 in the order defined by the frequency hopping pattern 300. The periodicity for each subband 305 may, in some aspects, be defined based on one or more communication parameters associated with the subband 305, such as a band occupancy of other network nodes.

In the example of FIG. 3B, if the frequency hopping pattern 300-b indicates a first periodicity associated with the time period 310-c for the subband 305-d and a second periodicity associated with the time period 310-d for the subband 305-a, then a network node may communicate via the subband 305-d for the time period 310-c (e.g., approximately two transmission occasions 315) before switching to the subband 305-a to perform the communications 325 for the time period 310-d (e.g., approximately four transmission occasions 315). The periodicities may correspond to a periodicity of granted transmission occasions 315 on the subband 305, in some aspects.

In some aspects, a first network node may indicate or define multiple grant configurations each associated with different frequency domain resource allocations and corresponding time periods for which the configuration is valid. For example, the first network node may transmit a control message (e.g., an RRC configuration) that indicates a set of different grant configurations. The control message may indicate a frequency domain resource allocation for each grant (e.g., an index of a subband 305 from among the subbands 305 within the BWP). The control message may additionally, or alternatively, indicate a time period 310 associated with each grant. A second network node may thereby switch between grant configurations in accordance with the time periods 310 (e.g., a timer).

The frequency hopping pattern 300-b may be based on the switches between grant configurations. For example, the transmission occasions 315 on the subband 305-d within the time period 310-c may be associated with a first grant configuration. Once the time period 310-c expires, the network node may switch to a second grant configuration associated with the transmission occasions 315 on the subband 305-a. In some other aspects, the first network node may transmit an activation DCI 320 that activates one of the configured grants at a time, and the switch may be based on the activation DCI 320 instead of the timer. For example, a first activation DCI 320 may activate the first grant configuration on the subband 305-d and a second activation DCI 320 (not pictured in FIG. 3B) may be transmitted to activate the second grant configuration on the subband 305-a, and so on.

The first network node may transmit one or more control messages to indicate a default or designated frequency hopping pattern 300 for the second network node to use, as described with reference to FIG. 2. In some aspects, if the first network node transmits a second control message that is indicative of the designated frequency hopping pattern 300, the second network node may determine the designated frequency hopping pattern based on a subband 305 via which the second control message is received. In such cases, a first control message may indicate a mapping between each frequency hopping pattern 300 of the set of one or more frequency hopping patterns 300 indicated via the first control message and a respective subband 305 of the two or more subbands 305 within the BWP. In the example of FIG. 3B, the first control message may map the frequency hopping pattern 300-b to the subband 305-b (e.g., Subband 2). The activation DCI 320 may be received via the subband 305-b. The second network node may determine that the activation DCI 320 is indicative of (e.g., selects, indicates, or activates) the frequency hopping pattern 300-b based on the activation DCI 320 being received via the subband 305-b and the mapping. Additionally, or alternatively, the activation DCI 320 may include one or more bits or fields configured to indicate an index or a pointer to the designated frequency hopping pattern.

In some aspects, the first network node may indicate a set of subbands 305 on which frequency hopping is valid and is to be applied. The first network node may transmit the indication via an RRC configuration, or some other type of control message. The indicated set of subbands may be applied for SPS, configured grant scheduling, or multiple shared channel scheduling scenarios. In the example of FIG. 3B, the first network node may indicate that from the subbands 305-a through 305-d in the BWP, subbands 305-a and 305-d are valid for hopping and the other subbands 305-b and 305-c are not valid for frequency hopping (e.g., only use Subbands {0, 3} from the set of Subbands {0, 1, 2, 3}). The subbands 305 that are included in the frequency hopping patterns 300 may be based on the indication.

The frequency hopping patterns 300 described herein may thereby indicate an order of subbands 305 and corresponding frequency resource allocations, one or more time periods 310 (e.g., quantities of transmission occasions 315, time durations, periodicities, or the like) for switching between the subbands 305, other parameters, or any combination thereof. A network node may perform communications 325 via one or more transmission occasions 315 on at least two subbands 305 within a BWP by switching between the subbands 305 in accordance with the frequency hopping parameters.

Figure 4:
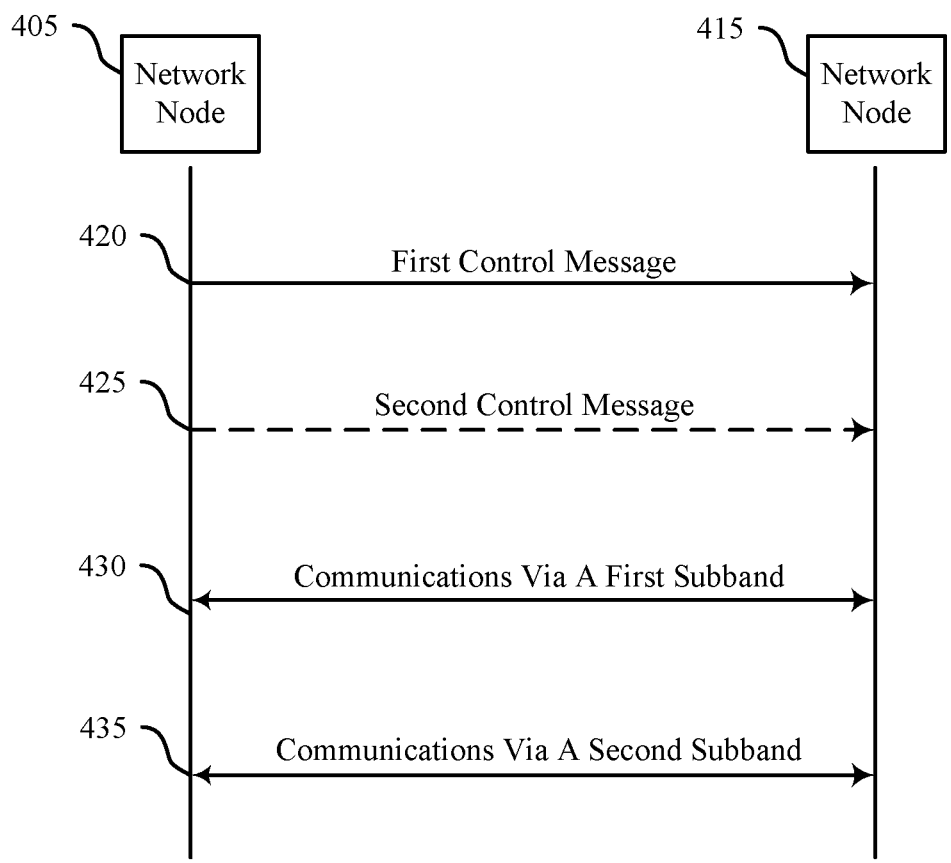
FIG. 4 illustrates an example of a process flow that supports frequency hopping across subbands within a BWP in accordance with one or more aspects of the present disclosure.

FIG. 4 illustrates an example of a process flow 400 that supports frequency hopping across subbands within a BWP in accordance with one or more aspects of the present disclosure. The process flow 400 may implement or be implemented by aspects of the wireless communications systems 100 and 200 or the frequency hopping patterns 300, as described with reference to FIGS. 1-3. For example, the process flow 400 illustrates communications between a network node 405 and a network node 415, which may represent aspects of corresponding devices as described with reference to FIGS. 1-3 (e.g., UEs, network entities, or some other devices). In some aspects, the network node 405 may transmit one or more control messages to the network node 415 to indicate or configure a designated frequency hopping pattern. The network node 415 may switch between frequency subbands within a BWP based on the designated frequency hopping pattern.

In the following description of the process flow 400, the operations between the network node 405 and the network node 415 may be performed in different orders or at different times. Some operations may also be left out of the process flow 400, or other operations may be added. Although the network node 405 and the network node 415 are shown performing the operations of the process flow 400, some aspects of some operations may also be performed by one or more other wireless devices.

At 420, the network node 405 may transmit a first control message to the network node 415. The first control message may indicate a set of one or more frequency hopping patterns for switching between two or more subbands within a BWP configured for the network node 415 (e.g., a system BWP). In some aspects, the first control message may be an RRC configuration that configures one or more grants (e.g., SPS or configured grants) and indicates the set of one or more frequency hopping patterns.

At 425, in some aspects, the network node 405 may transmit a second control message to the network node 415. The second control message may be indicative of a designated frequency hopping pattern from among the set of one or more frequency hopping patterns indicated via the first control message. In some aspects, the first control message may indicate a mapping between each frequency hopping pattern of the set of one or more frequency hopping patterns and a respective subband within the BWP. The second control message may be received via a subband that is mapped to the designated frequency hopping pattern, and the network node 415 may determine the designated frequency hopping pattern based on the subband on which the second control message is received.

In some other aspects (e.g., type 1 configured grant or SPS communications), the second control message may be a MAC-CE that indicates the designated frequency hopping pattern, which may be different than a default frequency hopping pattern indicated via the first control message. In such cases, the network node 415 may communicate via two or more subbands in accordance with the default frequency hopping pattern in response to receiving the first control message and before receiving the second control message. The network node 415 may switch to communicating according to the designated frequency hopping pattern in response to the second control message. In some other aspects (e.g., type 2 configured grant or SPS communications), the second control message may be DCI that activates a grant of the set of one or more grants and indicates the designated frequency hopping pattern from among the set of frequency hopping patterns indicated via the first control message (e.g., one or more bits or fields in the DCI indicate an index or pointer to the designated frequency hopping pattern.

At 430, the network node 405 and the network node 415 may communicate via a first subband of the two or more subbands within the BWP configured for the network node 405 and the network node 415. At 435, the network node 405 and the network node 415 may switch to communicating via a second subband of the two or more subbands within the BWP in accordance with the designated frequency hopping pattern. In some aspects, the network node 405 and the network node 415 may communicate via the first subband for a first time period before switching to the second subband, and the designated frequency hopping pattern may indicate or be associated with the time period. In some aspects, the network node 405 and the network node 415 may communicate via the first subband for a quantity of transmission occasions based on a first periodicity associated with the first subband before switching to the second subband for a second quantity of transmission occasions based on a second periodicity associated with the second subband, and the designated frequency hopping pattern may indicate or be associated with the first and second periodicities and an order for switching between subbands.

The network node 405 and the network node 415 may thereby communicate via one or more subbands within a BWP according to a designated frequency hopping pattern. The network node 415 may thereby support communications via a reduced bandwidth (e.g., a subband) while maintaining frequency diversity and throughput of communications. By indicating a designated frequency hopping pattern via one or more control messages, the network node 405 may improve coordination between devices, throughput, and communication reliability while reducing overhead.

Figure 5:
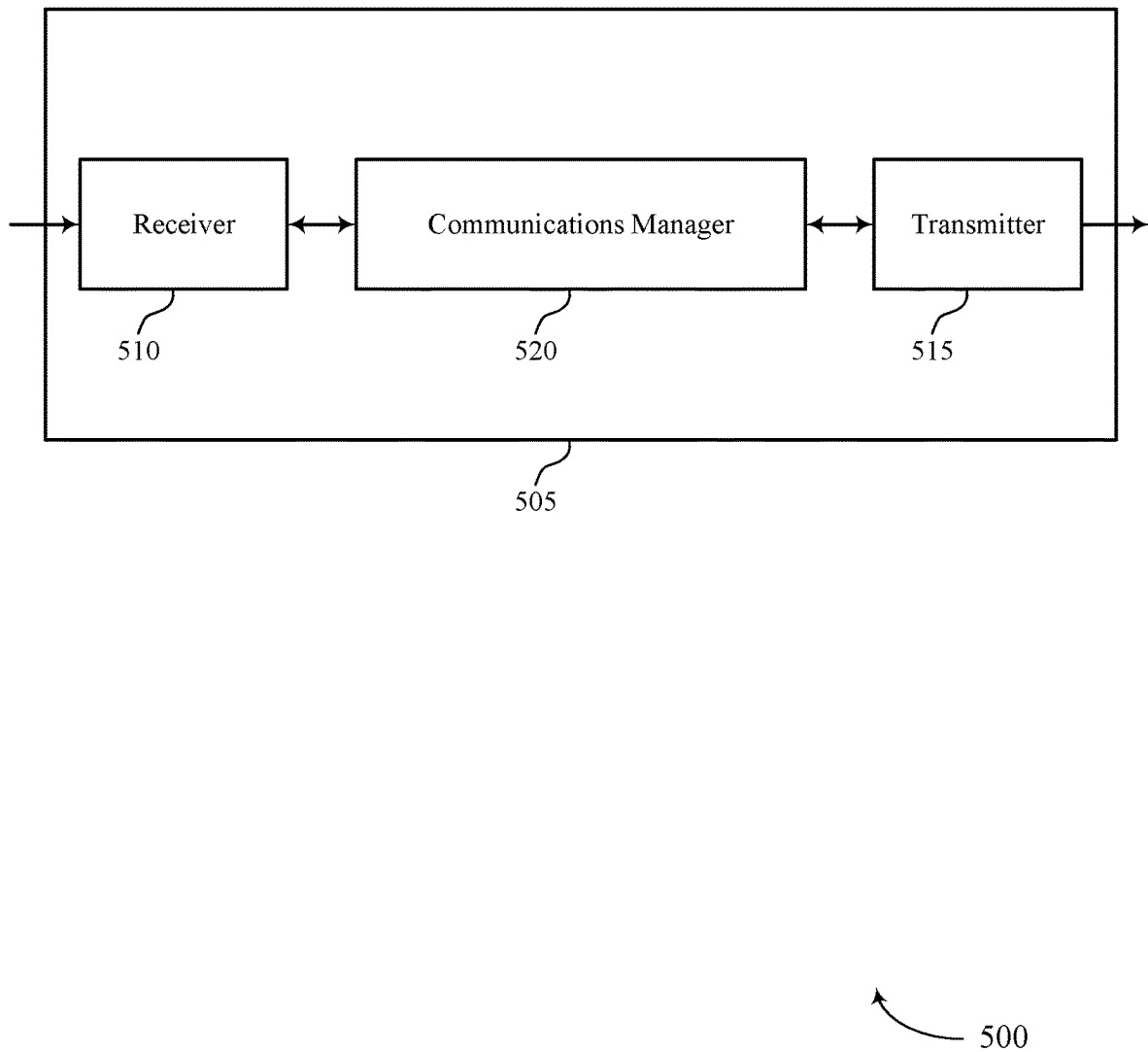
FIGS. 5 and 6 illustrate block diagrams of devices that support frequency hopping across subbands within a BWP in accordance with one or more aspects of the present disclosure.

FIG. 5 illustrates a block diagram 500 of a device 505 that supports frequency hopping across subbands within a BWP in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to frequency hopping across subbands within a BWP). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to frequency hopping across subbands within a BWP). In some aspects, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of frequency hopping across subbands within a BWP as described herein. For example, the communications manager 520, the receiver 510, the transmitter 515, or various combinations or components thereof may support a method for performing one or more of the functions described herein.

In some aspects, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first network node in accordance with aspects as disclosed herein. For example, the communications manager 520 may be configured as or otherwise support a means for receiving a first control message that indicates a set of one or more frequency hopping patterns for switching between two or more subbands within a BWP configured for the first network node. The communications manager 520 may be configured as or otherwise support a means for communicating via a first subband of the two or more subbands and via a second subband of the two or more subbands in accordance with a designated frequency hopping pattern from among the set of one or more frequency hopping patterns.

By including or configuring the communications manager 520 in accordance with aspects as described herein, the device 505 (e.g., a processor controlling or otherwise coupled with the receiver 510, the transmitter 515, the communications manager 520, or a combination thereof) may support techniques for reduced processing, reduced power consumption, and more efficient utilization of communication resources.

Figure 6:
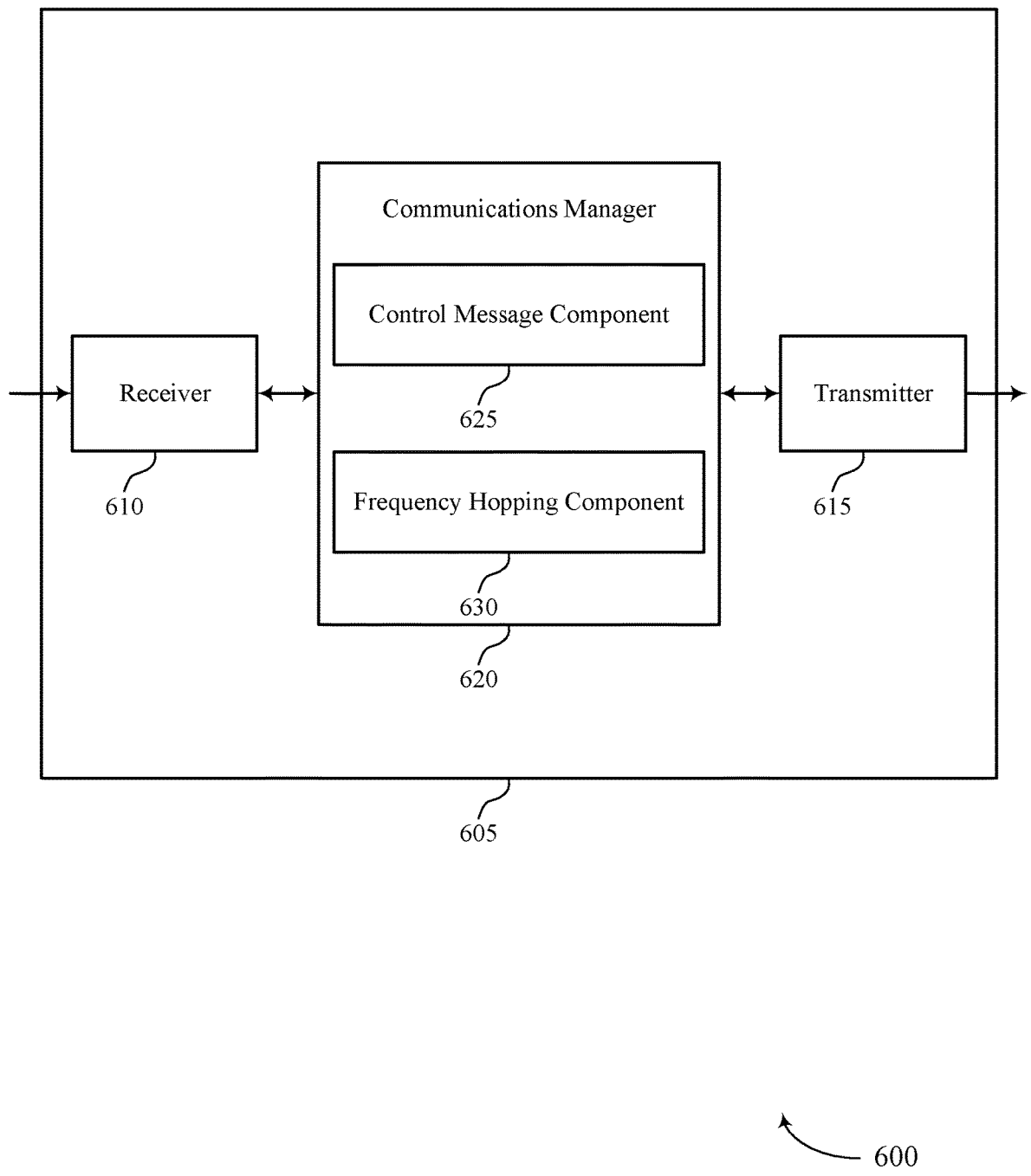

FIG. 6 illustrates a block diagram 600 of a device 605 that supports frequency hopping across subbands within a BWP in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to frequency hopping across subbands within a BWP). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to frequency hopping across subbands within a BWP). In some aspects, the transmitter 615 may be co-located with a receiver 610 in a transceiver module. The transmitter 615 may utilize a single antenna or a set of multiple antennas.

The device 605, or various components thereof, may be an example of means for performing various aspects of frequency hopping across subbands within a BWP as described herein. For example, the communications manager 620 may include a control message component 625 a frequency hopping component 630, or any combination thereof. The communications manager 620 may be an example of aspects of a communications manager 520 as described herein. In some aspects, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first network node in accordance with aspects as disclosed herein. The control message component 625 may be configured as or otherwise support a means for receiving a first control message that indicates a set of one or more frequency hopping patterns for switching between two or more subbands within a BWP configured for the first network node. The frequency hopping component 630 may be configured as or otherwise support a means for communicating via a first subband of the two or more subbands and via a second subband of the two or more subbands in accordance with a designated frequency hopping pattern from among the set of one or more frequency hopping patterns.

Figure 7:
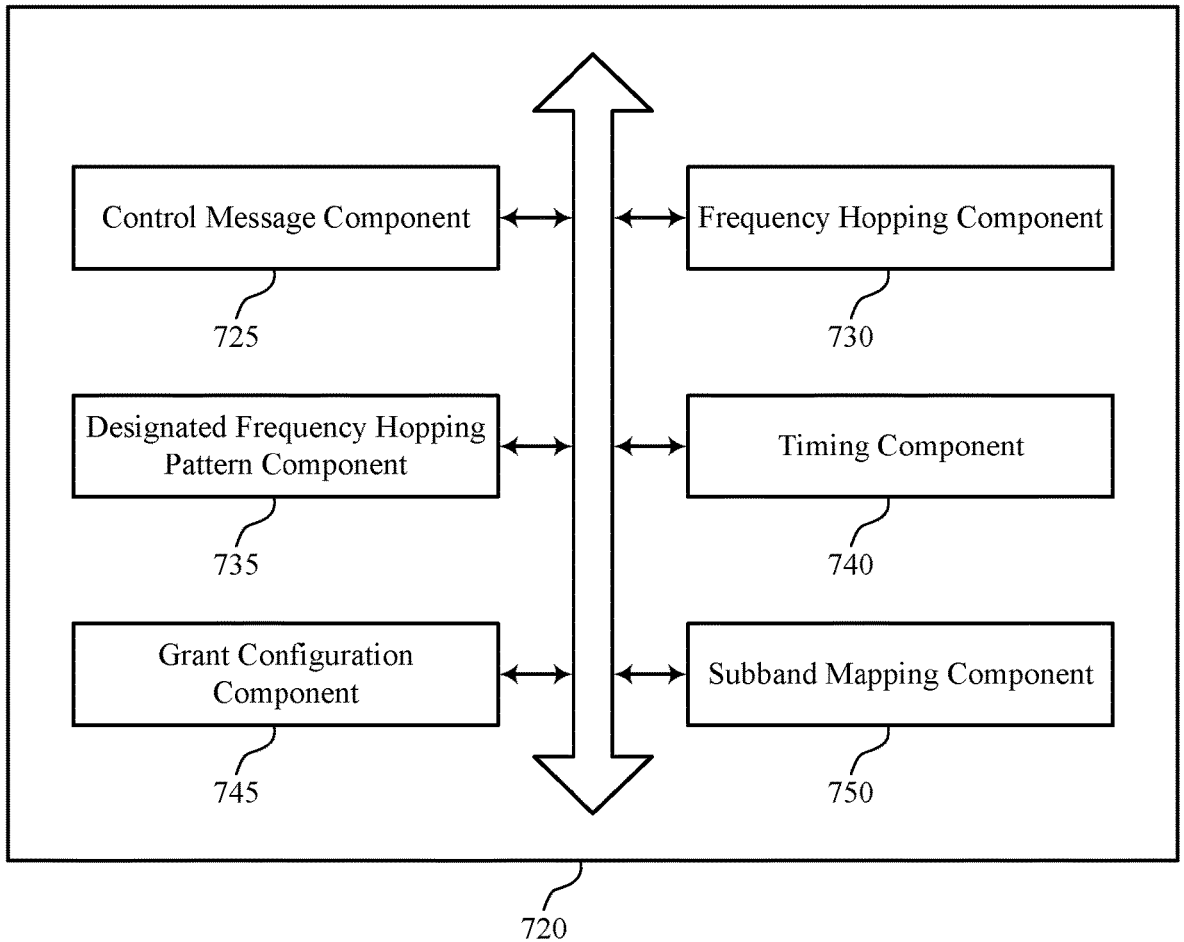
FIG. 7 illustrates a block diagram of a communications manager that supports frequency hopping across subbands within a BWP in accordance with one or more aspects of the present disclosure.

FIG. 7 illustrates a block diagram 700 of a communications manager 720 that supports frequency hopping across subbands within a BWP in accordance with one or more aspects of the present disclosure. The communications manager 720 may be an example of aspects of a communications manager 520, a communications manager 620, or both, as described herein. The communications manager 720, or various components thereof, may be an example of means for performing various aspects of frequency hopping across subbands within a BWP as described herein. For example, the communications manager 720 may include a control message component 725, a frequency hopping component 730, a designated frequency hopping pattern component 735, a timing component 740, a grant configuration component 745, a subband mapping component 750, or any combination thereof. Each of these components may communicate, directly or indirectly, with one another (e.g., via one or more buses).

The communications manager 720 may support wireless communication at a first network node in accordance with aspects as disclosed herein. The control message component 725 may be configured as or otherwise support a means for receiving a first control message that indicates a set of one or more frequency hopping patterns for switching between two or more subbands within a BWP configured for the first network node. The frequency hopping component 730 may be configured as or otherwise support a means for communicating via a first subband of the two or more subbands and via a second subband of the two or more subbands in accordance with a designated frequency hopping pattern from among the set of one or more frequency hopping patterns.

In some aspects, the designated frequency hopping pattern component 735 may be configured as or otherwise support a means for receiving a second control message that is indicative of the designated frequency hopping pattern from among the set of one or more frequency hopping patterns indicated via the first control message.

In some aspects, to support communicating via the first subband and the second subband, the timing component 740 may be configured as or otherwise support a means for communicating via the first subband for a first time period. In some aspects, to support communicating via the first subband and the second subband, the timing component 740 may be configured as or otherwise support a means for communicating, based on a switch from the first subband to the second subband in accordance with the designated frequency hopping pattern, via the second subband for a second time period, where the designated frequency hopping pattern indicates the first time period for communicating via the first subband, the second time period for communicating via the second subband, and an order for switching between the first subband and the second subband.

In some aspects, to support communicating via the first subband and the second subband, the timing component 740 may be configured as or otherwise support a means for communicating via the first subband for a first quantity of transmission occasions based on a first periodicity associated with the first subband. In some aspects, to support communicating via the first subband and the second subband, the timing component 740 may be configured as or otherwise support a means for communicating, based on a switch from the first subband to the second subband in accordance with the designated frequency hopping pattern, via the second subband for a second quantity of transmission occasions based on a second periodicity associated with the second subband, where the first control message configures a respective periodicity for each subband of the two or more subbands within the BWP, and where the designated frequency hopping pattern indicates the first periodicity, the second periodicity, and an order for switching between the first subband and the second subband.

In some aspects, the grant configuration component 745 may be configured as or otherwise support a means for receiving, via the first control message, a set of multiple grant configurations, where each grant configuration of the set of multiple grant configurations indicates a frequency domain allocation of a respective subband of the two or more subbands within the BWP and a time period associated with the respective grant configuration, and where each frequency hopping pattern of the set of one or more frequency hopping patterns indicates a respective order for switching between individual subbands of the two or more subbands in accordance with respective grant configurations corresponding to the individual subbands.

In some aspects, to support communicating via the first subband and the second subband, the frequency hopping component 730 may be configured as or otherwise support a means for communicating via the first subband for a first quantity of transmission occasions based on a first grant configuration of the set of multiple grant configurations associated with the first subband. In some aspects, to support communicating via the first subband and the second subband, the frequency hopping component 730 may be configured as or otherwise support a means for communicating, based on a switch from the first subband to the second subband in accordance with the designated frequency hopping pattern, via the second subband for a second quantity of transmission occasions based on a second grant configuration of the set of multiple grant configurations associated with the second subband.

In some aspects, the switch may be based on respective time periods associated with the first grant configuration and the second grant configuration, based on reception of DCI that activates the second grant configuration, or both.

In some aspects, the subband mapping component 750 may be configured as or otherwise support a means for receiving, via the first control message, a mapping between each frequency hopping pattern of the set of one or more frequency hopping patterns and a respective subband of the two or more subbands. In some aspects, the subband mapping component 750 may be configured as or otherwise support a means for receiving a second control message via a subband of the two or more subbands, where the second control message is indicative of the designated frequency hopping pattern based on the subband of the two or more subbands on which the second control message is received and based on the mapping.

In some aspects, the subband mapping component 750 may be configured as or otherwise support a means for receiving, via the first control message, an indication of a subset of subbands of a set of multiple subbands within the BWP configured for the first network node, where the first control message indicates that frequency hopping is activated within the subset of subbands and deactivated within remaining subbands of the set of multiple subbands of the BWP.

In some aspects, to support receiving the first control message, the control message component 725 may be configured as or otherwise support a means for receiving, as the first control message, an RRC message that configures a set of one or more grants for scheduling communications by the first network node and indicates a respective set of one or more frequency hopping patterns for each grant of the set of one or more grants. In some aspects, the RRC message indicates the designated frequency hopping pattern.

In some aspects, the designated frequency hopping pattern component 735 may be configured as or otherwise support a means for receiving a MAC-CE that indicates a grant of the set of one or more grants and the designated frequency hopping pattern from among a set of one or more frequency hopping patterns associated with the grant, where the designated frequency hopping pattern is different than a default frequency hopping pattern indicated by the first control message. In some aspects, the frequency hopping component 730 may be configured as or otherwise support a means for communicating via at least two subbands of the two or more subbands in accordance with the designated frequency hopping pattern after a switch from the default frequency hopping pattern to the designated frequency hopping pattern based on the MAC-CE.

In some aspects, the designated frequency hopping pattern component 735 may be configured as or otherwise support a means for receiving DCI that activates a grant of the set of one or more grants and indicates the designated frequency hopping pattern from among the respective set of frequency hopping patterns indicated via the RRC message.

In some aspects, the frequency hopping component 730 may be configured as or otherwise support a means for receiving a MAC-CE that indicates a subset of frequency hopping patterns from among the respective sets of one or more frequency hopping patterns indicated via the RRC message, where the DCI indicates the designated frequency hopping pattern from among the subset of frequency hopping patterns indicated via the MAC-CE.

In some aspects, the set of one or more grants includes configured grants, semi-persistent scheduling grants, DCI grants for uplink shared channels, DCI grants for downlink shared channels, or any combination thereof.

Figure 8:
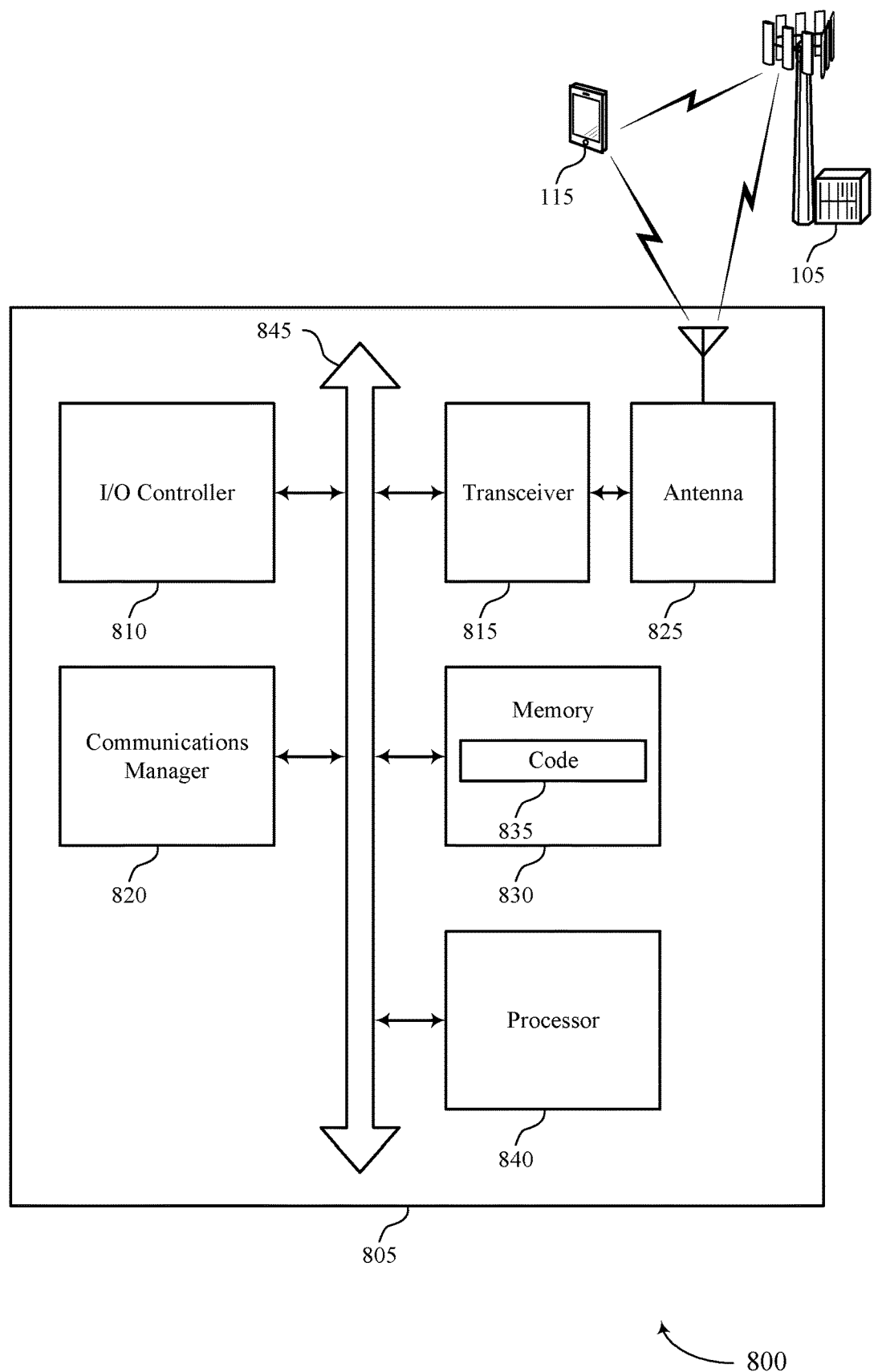
FIG. 8 illustrates a diagram of a system including a device that supports frequency hopping across subbands within a BWP in accordance with one or more aspects of the present disclosure.

FIG. 8 illustrates a diagram of a system 800 including a device 805 that supports frequency hopping across subbands within a BWP in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting frequency hopping across subbands within a BWP). For example, the device 805 or a component of the device 805 may include a processor 840 and memory 830 coupled with or to the processor 840, the processor 840 and memory 830 configured to perform various functions described herein.

The communications manager 820 may support wireless communication at a first network node in accordance with aspects as disclosed herein. For example, the communications manager 820 may be configured as or otherwise support a means for receiving a first control message that indicates a set of one or more frequency hopping patterns for switching between two or more subbands within a BWP configured for the first network node. The communications manager 820 may be configured as or otherwise support a means for communicating via a first subband of the two or more subbands and via a second subband of the two or more subbands in accordance with a designated frequency hopping pattern from among the set of one or more frequency hopping patterns.

By including or configuring the communications manager 820 in accordance with aspects as described herein (e.g., by supporting frequency hopping across subbands within a BWP), the device 805 may support techniques for improved communication reliability, reduced latency, improved user experience related to reduced processing, reduced power consumption, more efficient utilization of communication resources, improved coordination between devices, and longer battery life.

In some aspects, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some aspects, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of frequency hopping across subbands within a BWP as described herein, or the processor 840 and the memory 830 may be otherwise configured to perform or support such operations.

Figure 9:
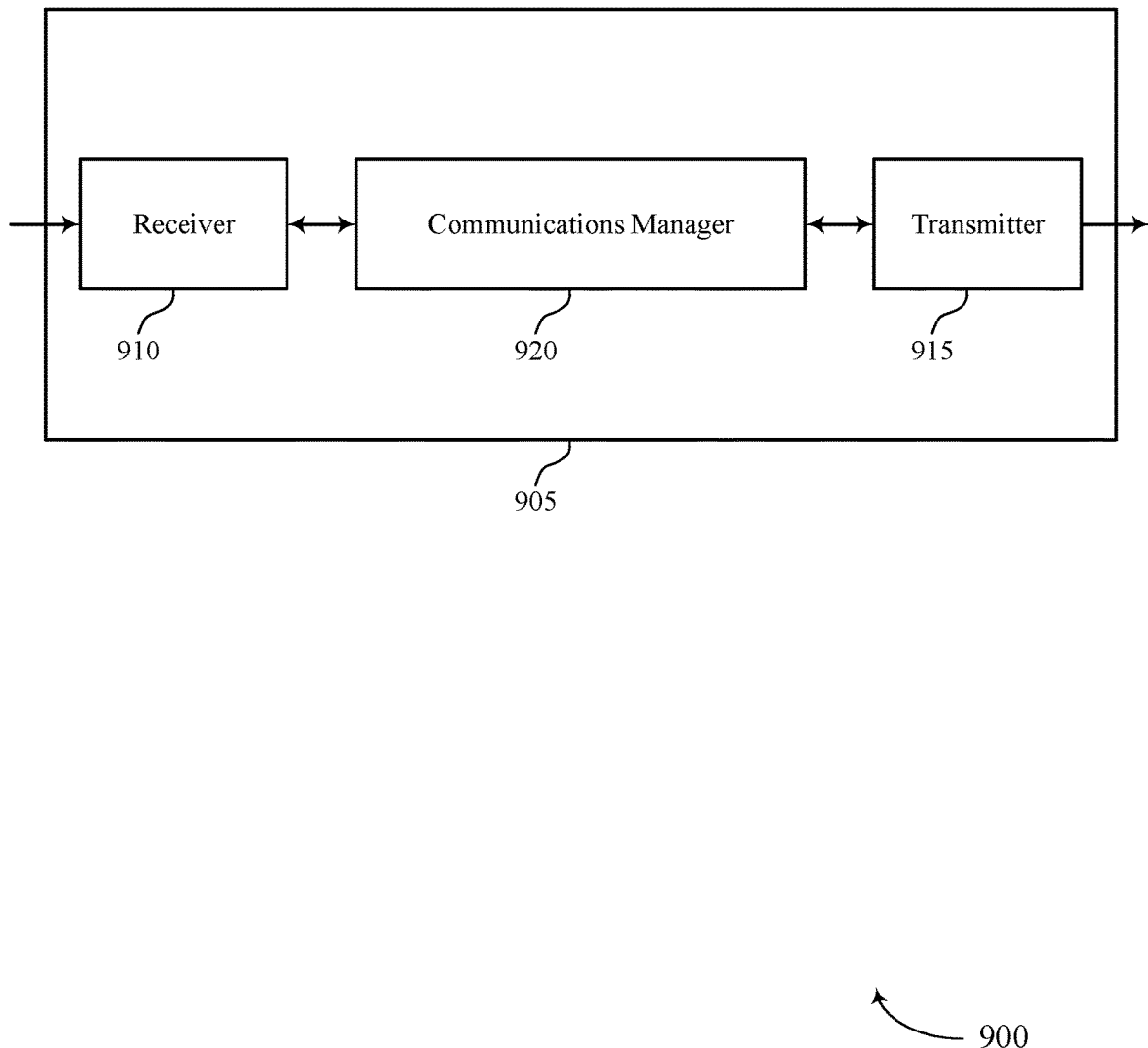
FIGS. 9 and 10 illustrate block diagrams of devices that support frequency hopping across subbands within a BWP in accordance with one or more aspects of the present disclosure.

FIG. 9 illustrates a block diagram 900 of a device 905 that supports frequency hopping across subbands within a BWP in accordance with one or more aspects of the present disclosure. The device 905 may be an example of aspects of a first network node (e.g., a network entity 105) as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some aspects, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some aspects, the transmitter 915 and the receiver 910 may be co-located in a transceiver, which may include or be coupled with a modem.

The communications manager 920, the receiver 910, the transmitter 915, or various combinations thereof or various components thereof may be aspects of means for performing various aspects of frequency hopping across subbands within a BWP as described herein. For example, the communications manager 920, the receiver 910, the transmitter 915, or various combinations or components thereof may support a method for performing one or more of the functions described herein.

In some aspects, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first network node in accordance with aspects as disclosed herein. For example, the communications manager 920 may be configured as or otherwise support a means for transmitting a first control message that indicates a set of one or more frequency hopping patterns for switching between two or more subbands within a BWP configured for a second network node in communication with the first network node. The communications manager 920 may be configured as or otherwise support a means for communicating via a first subband of the two or more subbands and via a second subband of the two or more subbands in accordance with a designated frequency hopping pattern from among the set of one or more frequency hopping patterns.

By including or configuring the communications manager 920 in accordance with aspects as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources.

Figure 10:
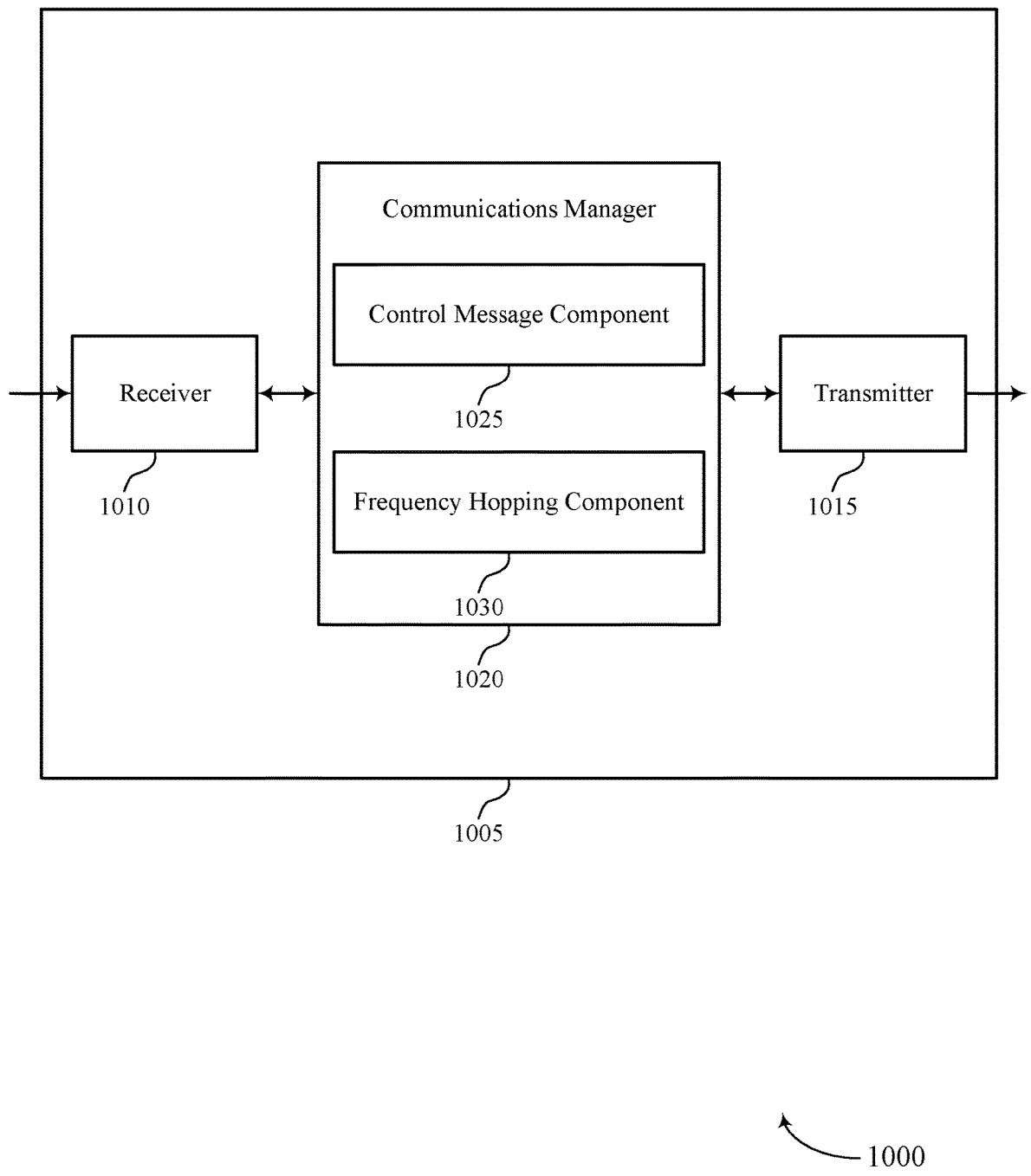

FIG. 10 illustrates a block diagram 1000 of a device 1005 that supports frequency hopping across subbands within a BWP in accordance with one or more aspects of the present disclosure. The device 1005 may be an example of aspects of a first network node, a device 905, or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some aspects, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some aspects, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some aspects, the transmitter 1015 and the receiver 1010 may be co-located in a transceiver, which may include or be coupled with a modem.

The device 1005, or various components thereof, may be an example of means for performing various aspects of frequency hopping across subbands within a BWP as described herein. For example, the communications manager 1020 may include a control message component 1025 a frequency hopping component 1030, or any combination thereof. The communications manager 1020 may be an example of aspects of a communications manager 920 as described herein. In some aspects, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first network node in accordance with aspects as disclosed herein. The control message component 1025 may be configured as or otherwise support a means for transmitting a first control message that indicates a set of one or more frequency hopping patterns for switching between two or more subbands within a BWP configured for a second network node in communication with the first network node. The frequency hopping component 1030 may be configured as or otherwise support a means for communicate via a first subband of the two or more subbands and via a second subband of the two or more subbands in accordance with a designated frequency hopping pattern from among the set of one or more frequency hopping patterns.

Figure 11:
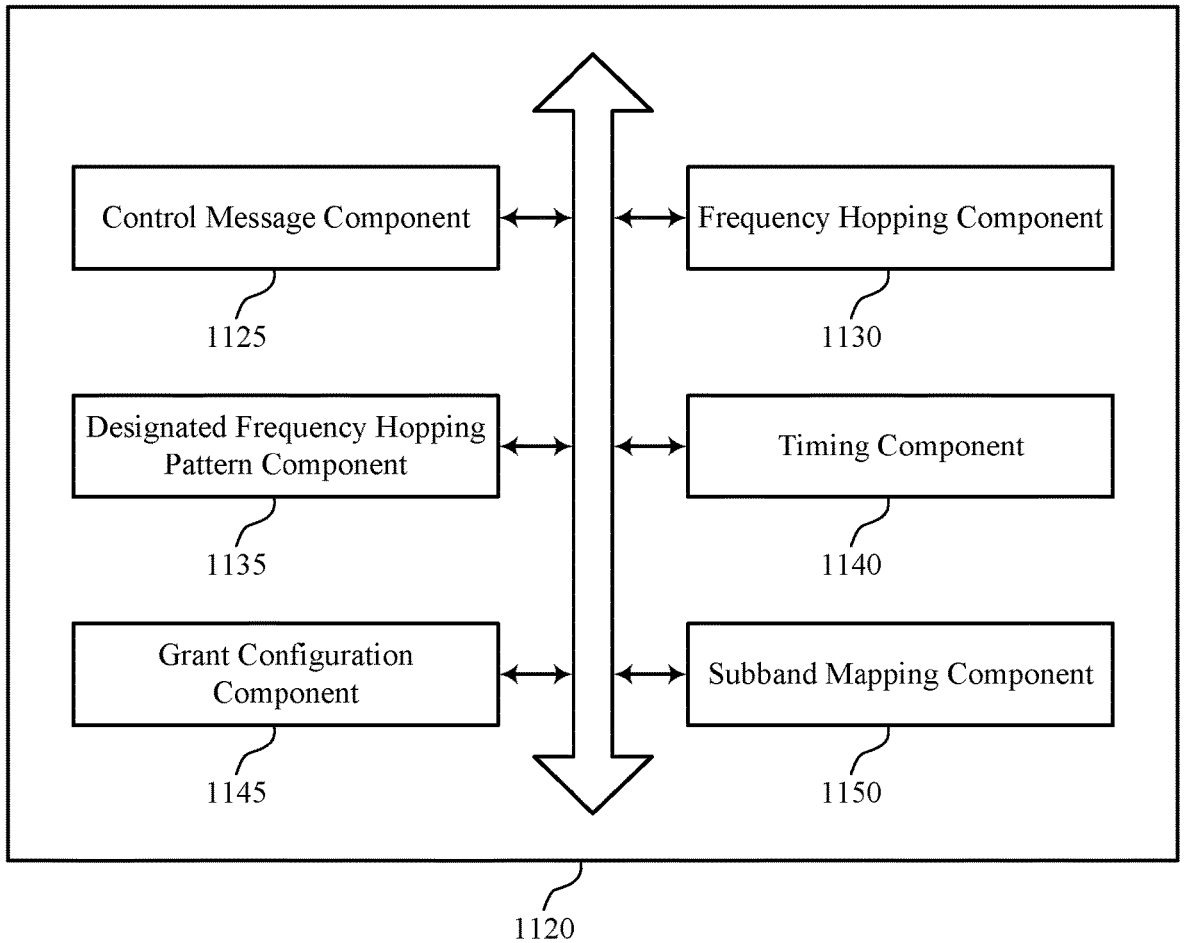
FIG. 11 illustrates a block diagram of a communications manager that supports frequency hopping across subbands within a BWP in accordance with one or more aspects of the present disclosure.

FIG. 11 illustrates a block diagram 1100 of a communications manager 1120 that supports frequency hopping across subbands within a BWP in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of frequency hopping across subbands within a BWP as described herein. For example, the communications manager 1120 may include a control message component 1125, a frequency hopping component 1130, a designated frequency hopping pattern component 1135, a timing component 1140, a grant configuration component 1145, a subband mapping component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a first network node in accordance with aspects as disclosed herein. The control message component 1125 may be configured as or otherwise support a means for transmitting a first control message that indicates a set of one or more frequency hopping patterns for switching between two or more subbands within a BWP configured for a second network node in communication with the first network node. The frequency hopping component 1130 may be configured as or otherwise support a means for communicating via a first subband of the two or more subbands and via a second subband of the two or more subbands in accordance with a designated frequency hopping pattern from among the set of one or more frequency hopping patterns.

In some aspects, the designated frequency hopping pattern component 1135 may be configured as or otherwise support a means for transmitting a second control message that is indicative of the designated frequency hopping pattern from among the set of one or more frequency hopping patterns indicated via the first control message.

In some aspects, to support communicating via the first subband and the second subband, the timing component 1140 may be configured as or otherwise support a means for communicating via the first subband for a first time period. In some aspects, to support communicating via the first subband and the second subband, the timing component 1140 may be configured as or otherwise support a means for communicating, based on a switch from the first subband to the second subband in accordance with the designated frequency hopping pattern, via the second subband for a second time period, where the designated frequency hopping pattern indicates the first time period for communicating via the first subband, the second time period for communicating via the second subband, and an order for switching between the first subband and the second subband.

In some aspects, to support communicating via the first subband and the second subband, the timing component 1140 may be configured as or otherwise support a means for communicating via the first subband for a first quantity of transmission occasions based on a first periodicity associated with the first subband. In some aspects, to support communicating via the first subband and the second subband, the timing component 1140 may be configured as or otherwise support a means for communicating, based on a switch from the first subband to the second subband in accordance with the designated frequency hopping pattern, via the second subband for a second quantity of transmission occasions based on a second periodicity associated with the second subband, where the first control message configures a respective periodicity for each subband of the two or more subbands within the BWP, and where the designated frequency hopping pattern indicates the first periodicity, the second periodicity, and an order for switching between the first subband and the second subband.

In some aspects, the grant configuration component 1145 may be configured as or otherwise support a means for transmitting, via the first control message, a set of multiple grant configurations, where each grant configuration of the set of multiple grant configurations indicates a frequency domain allocation of a respective subband of the two or more subbands within the BWP and a time period associated with the respective grant configuration, and where each frequency hopping pattern of the set of one or more frequency hopping patterns indicates a respective order for switching between individual subbands of the two or more subbands in accordance with respective grant configurations corresponding to the individual subbands.

In some aspects, to support communicating via the first subband and the second subband, the frequency hopping component 1130 may be configured as or otherwise support a means for communicating via the first subband for a first quantity of transmission occasions based on a first grant configuration of the set of multiple grant configurations associated with the first subband. In some aspects, to support communicating via the first subband and the second subband, the frequency hopping component 1130 may be configured as or otherwise support a means for communicating, based on a switch from the first subband to the second subband in accordance with the designated frequency hopping pattern, via the second subband for a second quantity of transmission occasions based on a second grant configuration of the set of multiple grant configurations associated with the second subband.

In some aspects, the subband mapping component 1150 may be configured as or otherwise support a means for transmitting, via the first control message, a mapping between each frequency hopping pattern of the set of one or more frequency hopping patterns and a respective subband of the two or more subbands. In some aspects, the subband mapping component 1150 may be configured as or otherwise support a means for transmitting a second control message via a subband of the two or more subbands, where the second control message is indicative of the designated frequency hopping pattern based on the subband of the two or more subbands on which the second control message is transmitted and based on the mapping.

In some aspects, the subband mapping component 1150 may be configured as or otherwise support a means for transmitting, via the first control message, an indication of a subset of subbands of a set of multiple subbands within the BWP, where the first control message indicates that frequency hopping is activated within the subset of subbands and deactivated within remaining subbands of the set of multiple subbands of the BWP.

In some aspects, to support transmitting the first control message, the control message component 1125 may be configured as or otherwise support a means for transmitting, as the first control message, an RRC message that configures a set of one or more grants for scheduling communications by the first network node and indicates a respective set of one or more frequency hopping patterns for each grant of the set of one or more grants. In some aspects, the RRC message indicates the designated frequency hopping pattern.

In some aspects, the designated frequency hopping pattern component 1135 may be configured as or otherwise support a means for transmitting a MAC-CE that indicates a grant of the set of one or more grants and the designated frequency hopping pattern from among a set of one or more frequency hopping patterns associated with the grant, where the designated frequency hopping pattern is different than a default frequency hopping pattern indicated by the first control message. In some aspects, the frequency hopping component 1130 may be configured as or otherwise support a means for communicating via at least two subbands of the two or more subbands in accordance with the designated frequency hopping pattern after a switch from the default frequency hopping pattern to the designated frequency hopping pattern based on the MAC-CE.

In some aspects, the designated frequency hopping pattern component 1135 may be configured as or otherwise support a means for transmitting DCI that activates a grant of the set of one or more grants and indicates the designated frequency hopping pattern from among the respective set of frequency hopping patterns indicated via the RRC message.

In some aspects, the frequency hopping component 1130 may be configured as or otherwise support a means for transmitting a MAC-CE that indicates a subset of frequency hopping patterns from among the respective sets of one or more frequency hopping patterns indicated via the RRC message, where the DCI indicates the designated frequency hopping pattern from among the subset of frequency hopping patterns indicated via the MAC-CE.

Figure 12:
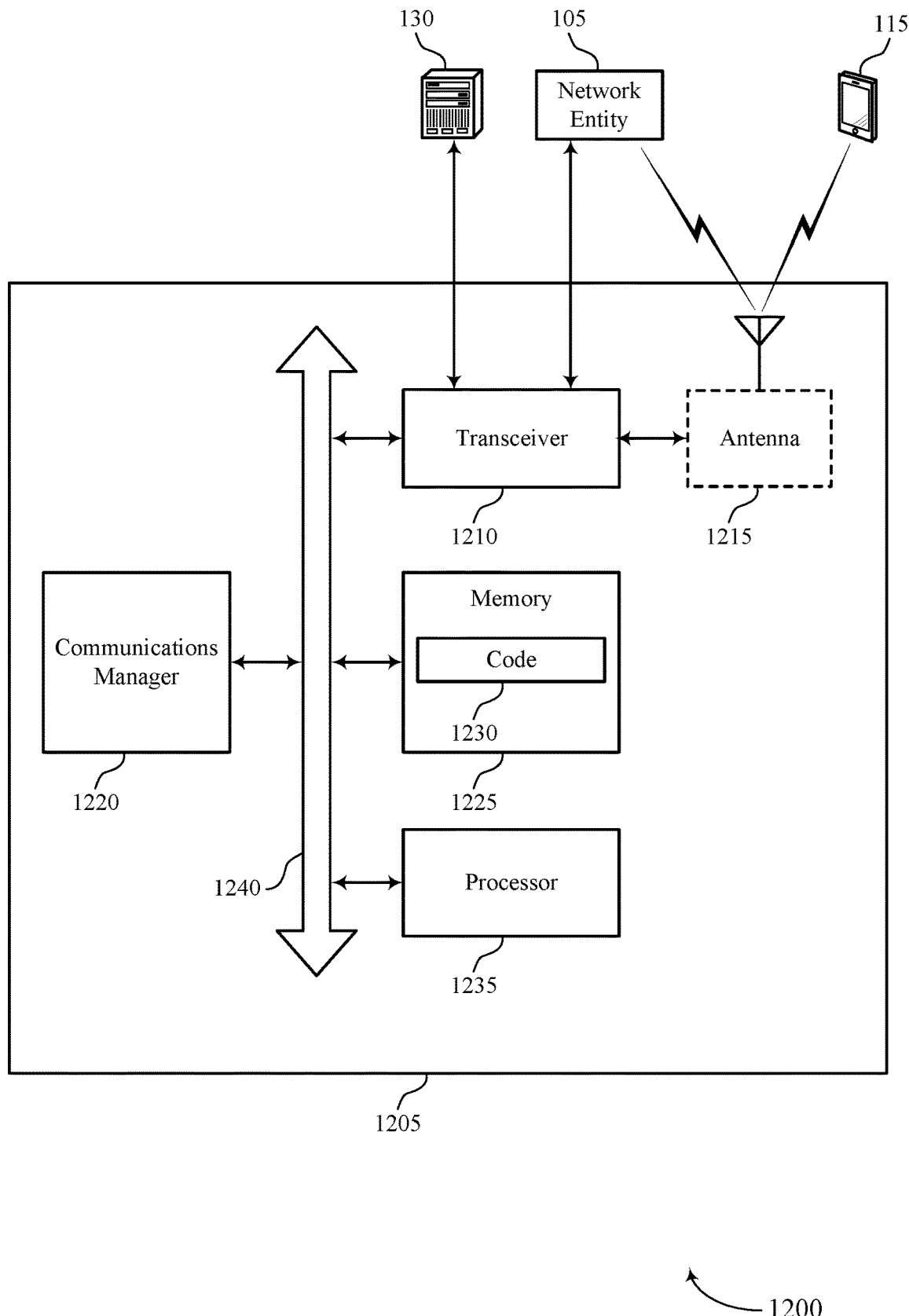
FIG. 12 illustrates a diagram of a system including a device that supports frequency hopping across subbands within a BWP in accordance with one or more aspects of the present disclosure.

FIG. 12 illustrates a diagram of a system 1200 including a device 1205 that supports frequency hopping across subbands within a BWP in accordance with one or more aspects of the present disclosure. The device 1205 may be an example of or include the components of a first network node, a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some aspects, the transceiver 1210 may include a wired transceiver and may communicate bi-directionally with another wired transceiver. Additionally, or alternatively, in some aspects, the transceiver 1210 may include a wireless transceiver and may communicate bi-directionally with another wireless transceiver. In some aspects, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some aspects, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting frequency hopping across subbands within a BWP). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1240 may support communications of (e.g., within) a protocol layer of a protocol stack. In some aspects, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some aspects, the communications manager 1220 may manage aspects of communications with a core network 130 (e.g., via one or more wired or wireless backhaul links). For example, the communications manager 1220 may manage the transfer of data communications for client devices, such as one or more UEs 115. In some aspects, the communications manager 1220 may manage communications with other network entities 105, and may include a controller or scheduler for controlling communications with UEs 115 in cooperation with other network entities 105. In some aspects, the communications manager 1220 may support an X2 interface within an LTE/LTE-A wireless communications network technology to provide communication between network entities 105.

The communications manager 1220 may support wireless communication at a first network node in accordance with aspects as disclosed herein. For example, the communications manager 1220 may be configured as or otherwise support a means for transmitting a first control message that indicates a set of one or more frequency hopping patterns for switching between two or more subbands within a BWP configured for a second network node in communication with the first network node. The communications manager 1220 may be configured as or otherwise support a means for communicating via a first subband of the two or more subbands and via a second subband of the two or more subbands in accordance with a designated frequency hopping pattern from among the set of one or more frequency hopping patterns.

By including or configuring the communications manager 1220 in accordance with aspects as described herein, the device 1205 may support techniques for improved communication reliability, reduced latency, reduced power consumption, more efficient utilization of communication resources, improved coordination between devices, and longer battery life.

In some aspects, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some aspects, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of frequency hopping across subbands within a BWP as described herein, or the processor 1235 and the memory 1225 may be otherwise configured to perform or support such operations.

Figure 13:
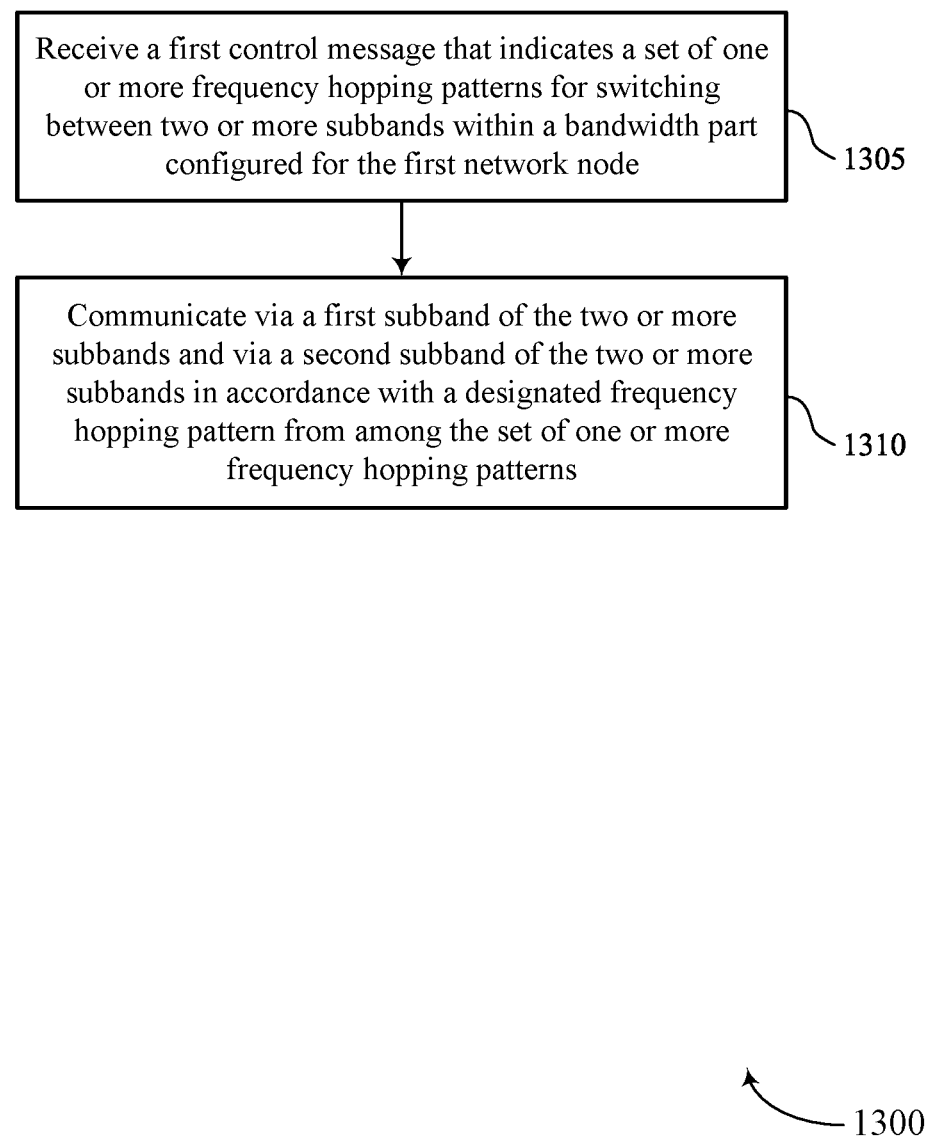
FIGS. 13 through 18 illustrate flowcharts showing methods that support frequency hopping across subbands within a BWP in accordance with one or more aspects of the present disclosure.

FIG. 13 illustrates a flowchart illustrating a method 1300 that supports frequency hopping across subbands within a BWP in accordance with one or more aspects of the present disclosure. The operations of the method 1300 may be implemented by a first network node (e.g., a UE 115) or its components as described herein. For example, the operations of the method 1300 may be performed by a first network node as described with reference to FIGS. 1 through 8. In some aspects, a first network node may execute a set of instructions to control the functional elements of the first network node to perform the described functions. Additionally, or alternatively, the first network node may perform aspects of the described functions using special-purpose hardware.

At 1305, the method may include receiving a first control message that indicates a set of one or more frequency hopping patterns for switching between two or more subbands within a BWP configured for the first network node. The operations of 1305 may be performed in accordance with aspects as disclosed herein. In some aspects, aspects of the operations of 1305 may be performed by a control message component 725 as described with reference to FIG. 7.

At 1310, the method may include communicating via a first subband of the two or more subbands and via a second subband of the two or more subbands in accordance with a designated frequency hopping pattern from among the set of one or more frequency hopping patterns. The operations of 1310 may be performed in accordance with aspects as disclosed herein. In some aspects, aspects of the operations of 1310 may be performed by a frequency hopping component 730 as described with reference to FIG. 7.

Figure 14:
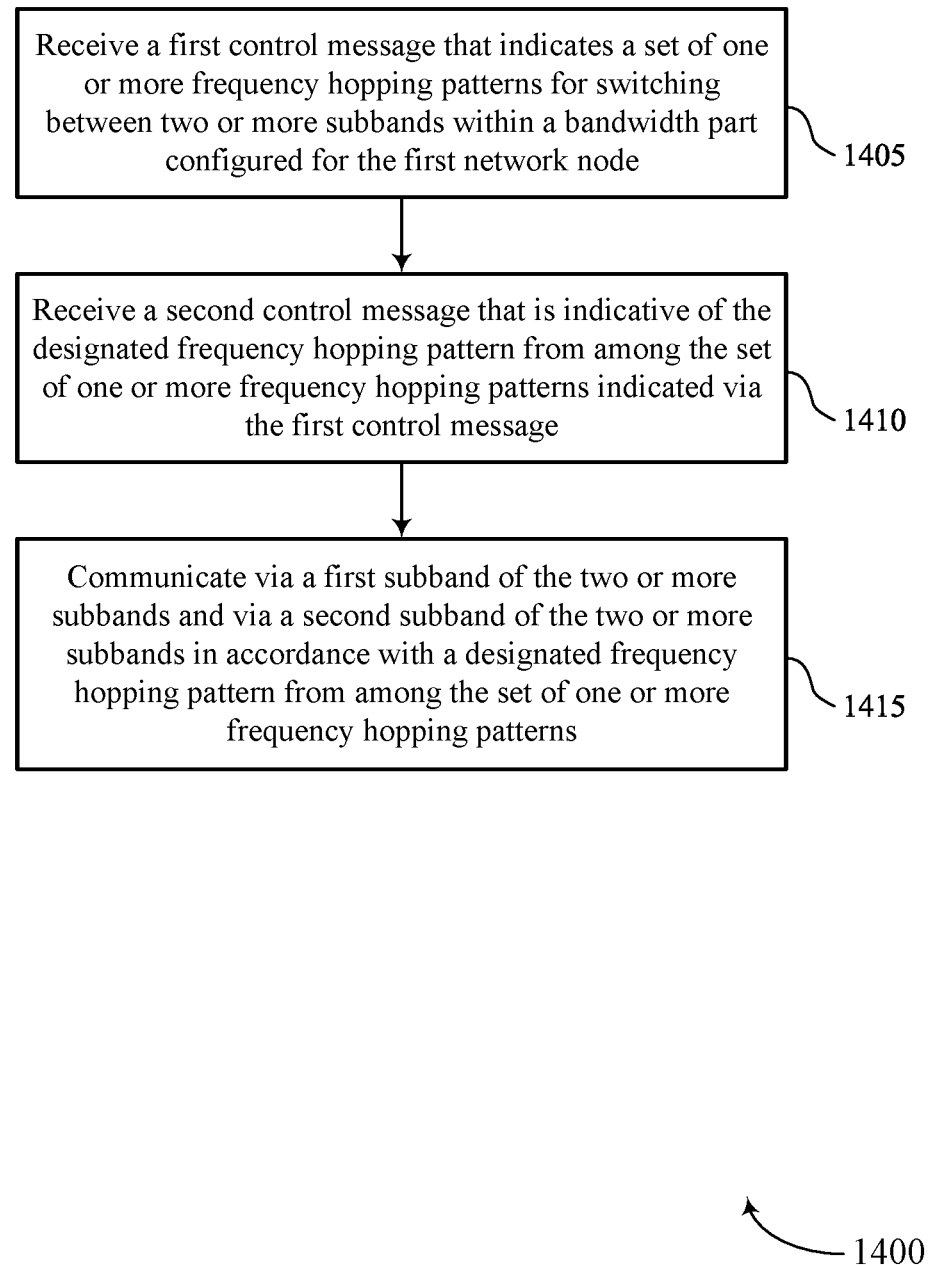

FIG. 14 illustrates a flowchart illustrating a method 1400 that supports frequency hopping across subbands within a BWP in accordance with one or more aspects of the present disclosure. The operations of the method 1400 may be implemented by a first network node (e.g., a UE 115) or its components as described herein. For example, the operations of the method 1400 may be performed by a first network node as described with reference to FIGS. 1 through 8. In some aspects, a first network node may execute a set of instructions to control the functional elements of the first network node to perform the described functions. Additionally, or alternatively, the first network node may perform aspects of the described functions using special-purpose hardware.

At 1405, the method may include receiving a first control message that indicates a set of one or more frequency hopping patterns for switching between two or more subbands within a BWP configured for the first network node. The operations of 1405 may be performed in accordance with aspects as disclosed herein. In some aspects, aspects of the operations of 1405 may be performed by a control message component 725 as described with reference to FIG. 7.

At 1410, the method may include receiving a second control message that is indicative of a designated frequency hopping pattern from among the set of one or more frequency hopping patterns indicated via the first control message. The operations of 1410 may be performed in accordance with aspects as disclosed herein. In some aspects, aspects of the operations of 1410 may be performed by a designated frequency hopping pattern component 735 as described with reference to FIG. 7.

At 1415, the method may include communicating via a first subband of the two or more subbands and via a second subband of the two or more subbands in accordance with the designated frequency hopping pattern from among the set of one or more frequency hopping patterns. The operations of 1415 may be performed in accordance with aspects as disclosed herein. In some aspects, aspects of the operations of 1415 may be performed by a frequency hopping component 730 as described with reference to FIG. 7.

Figure 15:
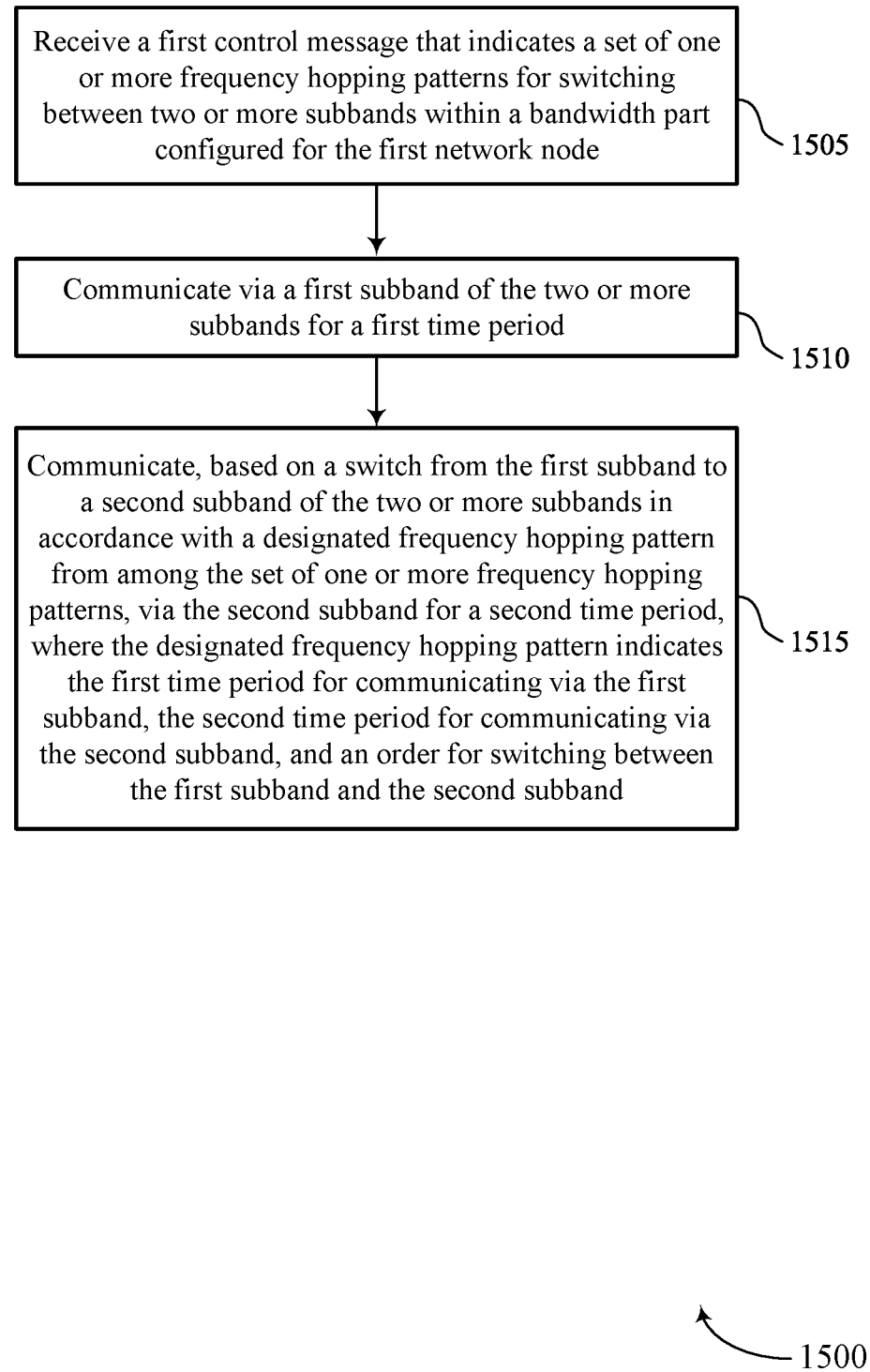

FIG. 15 illustrates a flowchart illustrating a method 1500 that supports frequency hopping across subbands within a BWP in accordance with one or more aspects of the present disclosure. The operations of the method 1500 may be implemented by a first network node (e.g., a UE 115) or its components as described herein. For example, the operations of the method 1500 may be performed by a first network node as described with reference to FIGS. 1 through 8. In some aspects, a first network node may execute a set of instructions to control the functional elements of the first network node to perform the described functions. Additionally, or alternatively, the first network node may perform aspects of the described functions using special-purpose hardware.

At 1505, the method may include receiving a first control message that indicates a set of one or more frequency hopping patterns for switching between two or more subbands within a BWP configured for the first network node. The operations of 1505 may be performed in accordance with aspects as disclosed herein. In some aspects, aspects of the operations of 1505 may be performed by a control message component 725 as described with reference to FIG. 7.

At 1510, the method may include communicating via a first subband of the two or more subbands for a first time period. The operations of 1510 may be performed in accordance with aspects as disclosed herein. In some aspects, aspects of the operations of 1510 may be performed by a timing component 740 as described with reference to FIG. 7.

At 1515, the method may include communicating, based on a switch from the first subband to a second subband of the two or more subbands in accordance with a designated frequency hopping pattern from among the set of one or more frequency hopping patterns, via the second subband for a second time period, where the designated frequency hopping pattern indicates the first time period for communicating via the first subband, the second time period for communicating via the second subband, and an order for switching between the first subband and the second subband. The operations of 1515 may be performed in accordance with aspects as disclosed herein. In some aspects, aspects of the operations of 1515 may be performed by a timing component 740 as described with reference to FIG. 7.

Figure 16:
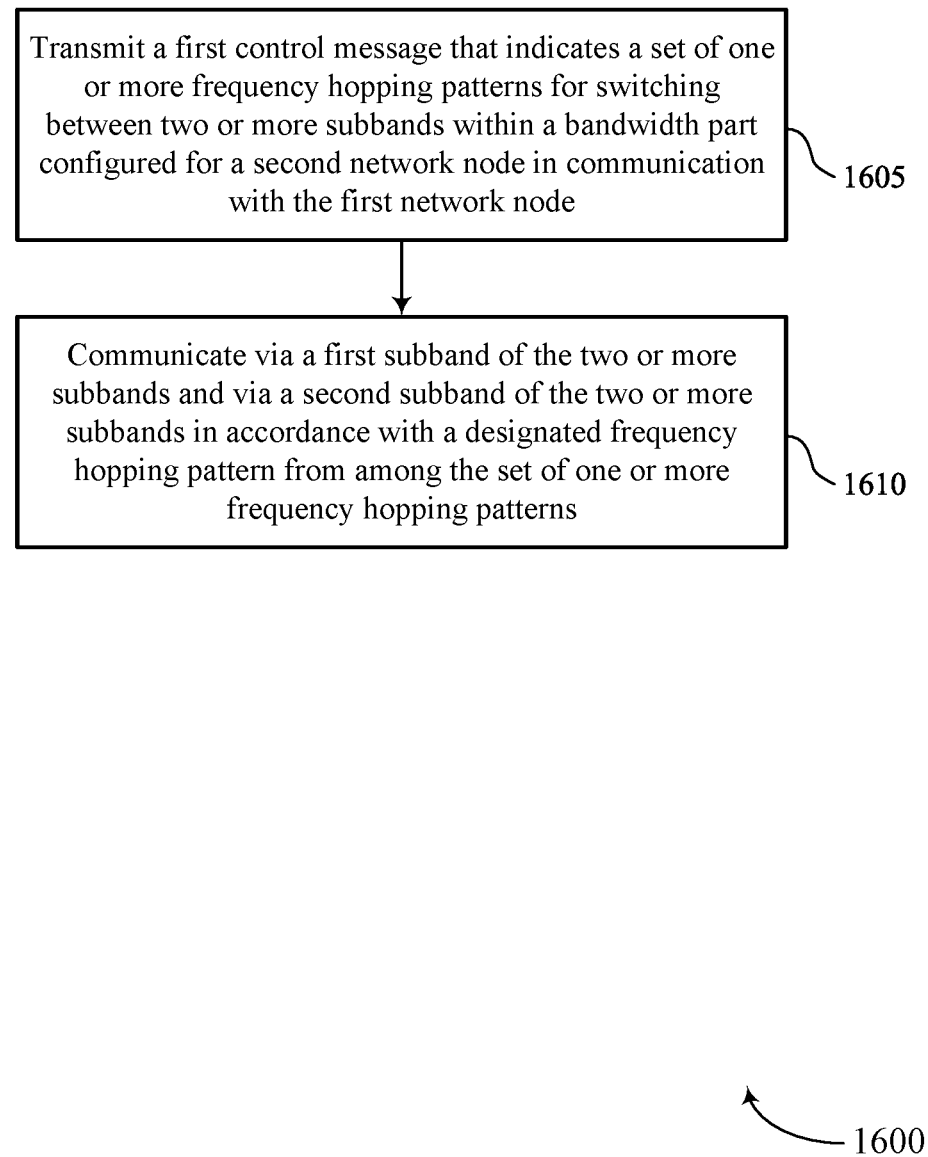

FIG. 16 illustrates a flowchart illustrating a method 1600 that supports frequency hopping across subbands within a BWP in accordance with one or more aspects of the present disclosure. The operations of the method 1600 may be implemented by a first network node (e.g., a network entity) or its components as described herein. For example, the operations of the method 1600 may be performed by a first network node as described with reference to FIGS. 1 through 4 and 9 through 12. In some aspects, a first network node may execute a set of instructions to control the functional elements of the first network node to perform the described functions. Additionally, or alternatively, the first network node may perform aspects of the described functions using special-purpose hardware.

At 1605, the method may include transmitting a first control message that indicates a set of one or more frequency hopping patterns for switching between two or more subbands within a BWP configured for a second network node in communication with the first network node. The operations of 1605 may be performed in accordance with aspects as disclosed herein. In some aspects, aspects of the operations of 1605 may be performed by a control message component 1125 as described with reference to FIG. 11.

At 1610, the method may include communicating via a first subband of the two or more subbands and via a second subband of the two or more subbands in accordance with a designated frequency hopping pattern from among the set of one or more frequency hopping patterns. The operations of 1610 may be performed in accordance with aspects as disclosed herein. In some aspects, aspects of the operations of 1610 may be performed by a frequency hopping component 1130 as described with reference to FIG. 11.

Figure 17:
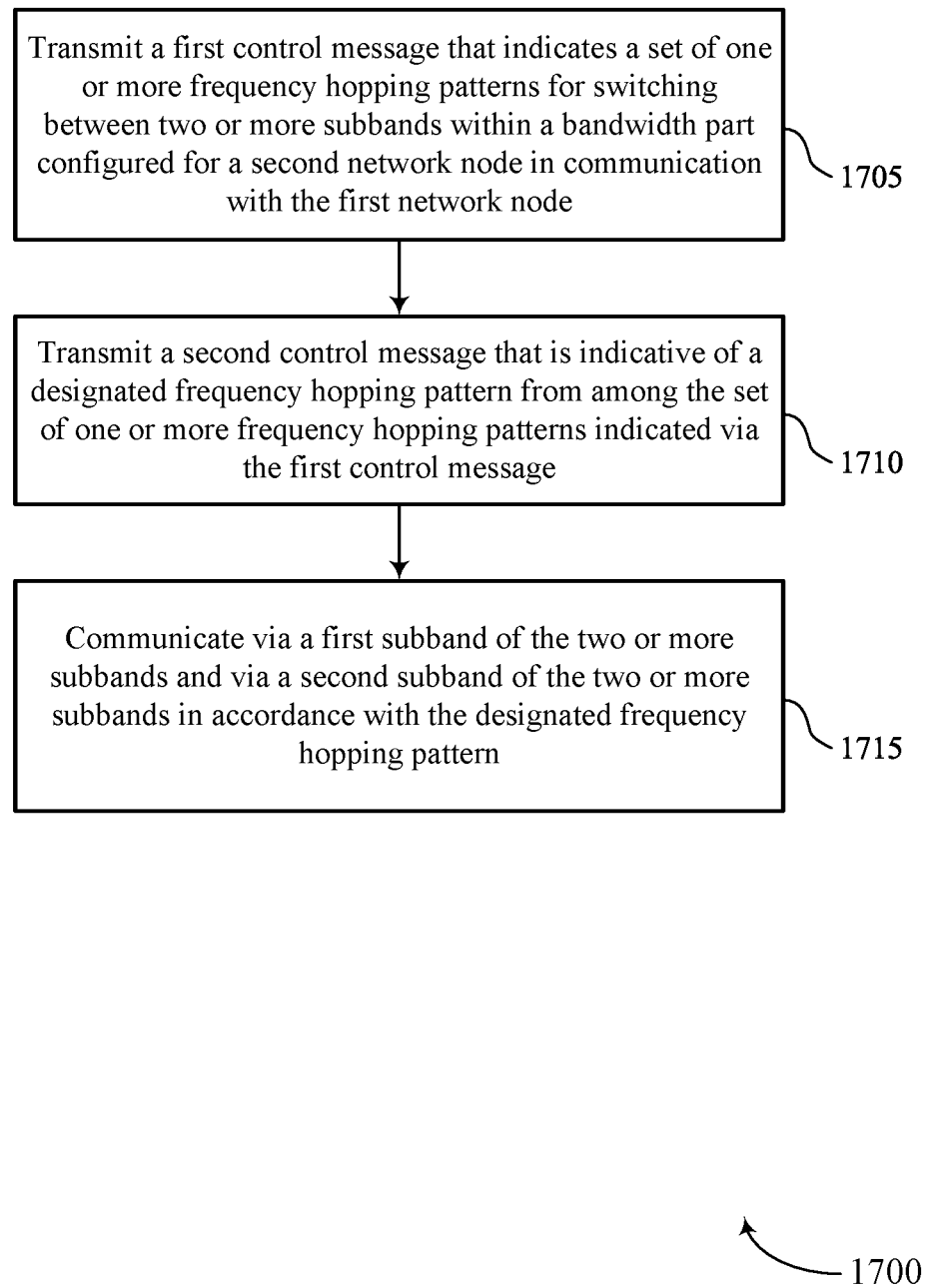

FIG. 17 illustrates a flowchart illustrating a method 1700 that supports frequency hopping across subbands within a BWP in accordance with one or more aspects of the present disclosure. The operations of the method 1700 may be implemented by a first network node (e.g., a network entity) or its components as described herein. For example, the operations of the method 1700 may be performed by a first network node as described with reference to FIGS. 1 through 4 and 9 through 12. In some aspects, a first network node may execute a set of instructions to control the functional elements of the first network node to perform the described functions. Additionally, or alternatively, the first network node may perform aspects of the described functions using special-purpose hardware.

At 1705, the method may include transmitting a first control message that indicates a set of one or more frequency hopping patterns for switching between two or more subbands within a BWP configured for a second network node in communication with the first network node. The operations of 1705 may be performed in accordance with aspects as disclosed herein. In some aspects, aspects of the operations of 1705 may be performed by a control message component 1125 as described with reference to FIG. 11.

At 1710, the method may include transmitting a second control message that is indicative of a designated frequency hopping pattern from among the set of one or more frequency hopping patterns indicated via the first control message. The operations of 1710 may be performed in accordance with aspects as disclosed herein. In some aspects, aspects of the operations of 1710 may be performed by a designated frequency hopping pattern component 1135 as described with reference to FIG. 11.

At 1715, the method may include communicating via a first subband of the two or more subbands and via a second subband of the two or more subbands in accordance with the designated frequency hopping pattern from among the set of one or more frequency hopping patterns. The operations of 1715 may be performed in accordance with aspects as disclosed herein. In some aspects, aspects of the operations of 1715 may be performed by a frequency hopping component 1130 as described with reference to FIG. 11.

Figure 18:
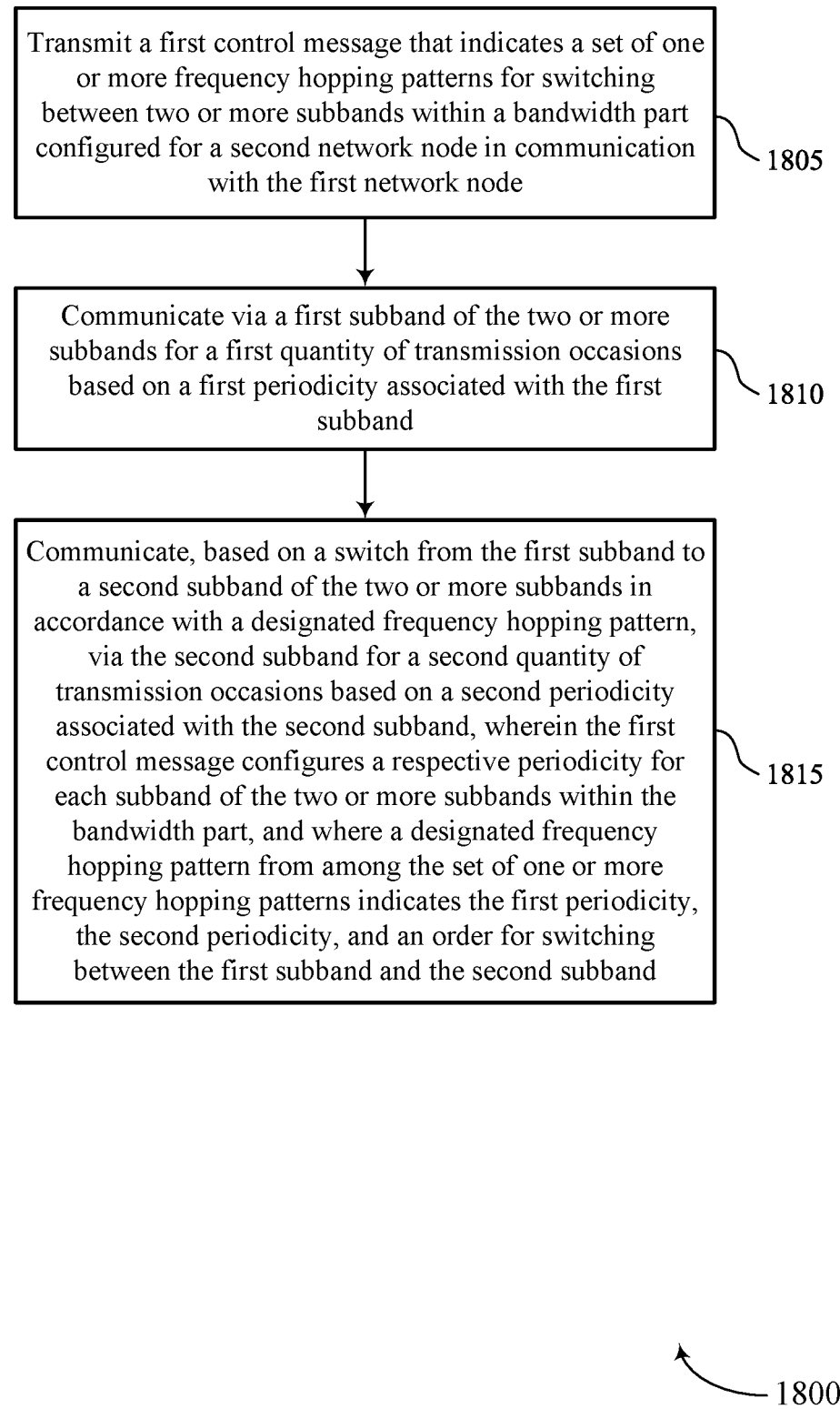

FIG. 18 illustrates a flowchart illustrating a method 1800 that supports frequency hopping across subbands within a BWP in accordance with one or more aspects of the present disclosure. The operations of the method 1800 may be implemented by a first network node (e.g., a network entity) or its components as described herein. For example, the operations of the method 1800 may be performed by a first network node as described with reference to FIGS. 1 through 4 and 9 through 12. In some aspects, a first network node may execute a set of instructions to control the functional elements of the first network node to perform the described functions. Additionally, or alternatively, the first network node may perform aspects of the described functions using special-purpose hardware.

At 1805, the method may include transmitting a first control message that indicates a set of one or more frequency hopping patterns for switching between two or more subbands within a BWP configured for a second network node in communication with the first network node. The operations of 1805 may be performed in accordance with aspects as disclosed herein. In some aspects, aspects of the operations of 1805 may be performed by a control message component 1125 as described with reference to FIG. 11.

At 1810, the method may include communicating via a first subband of the two or more subbands for a first quantity of transmission occasions based on a first periodicity associated with the first subband. The operations of 1810 may be performed in accordance with aspects as disclosed herein. In some aspects, aspects of the operations of 1810 may be performed by a timing component 1140 as described with reference to FIG. 11.

At 1815, the method may include communicating, based on a switch from the first subband to a second subband of the two or more subbands in accordance with a designated frequency hopping pattern from among the set of one or more frequency hopping patterns, via the second subband for a second quantity of transmission occasions based on a second periodicity associated with the second subband, where the first control message configures a respective periodicity for each subband of the two or more subbands within the BWP, and where the designated frequency hopping pattern indicates the first periodicity, the second periodicity, and an order for switching between the first subband and the second subband. The operations of 1815 may be performed in accordance with aspects as disclosed herein. In some aspects, aspects of the operations of 1815 may be performed by a timing component 1140 as described with reference to FIG. 11.

The following provides an overview of aspects of the present disclosure:

Aspect 1: A method for wireless communication at a first network node, comprising: receiving a first control message that indicates a set of one or more frequency hopping patterns for switching between two or more subbands within a BWP configured for the first network node; and communicating via a first subband of the two or more subbands and via a second subband of the two or more subbands in accordance with a designated frequency hopping pattern from among the set of one or more frequency hopping patterns.

Aspect 2: The method of aspect 1, further comprising: receiving a second control message that is indicative of the designated frequency hopping pattern from among the set of one or more frequency hopping patterns indicated via the first control message.

Aspect 3: The method of any of aspects 1 through 2, wherein communicating via the first subband and the second subband comprises: communicating via the first subband for a first time period; and communicating, based on a switch from the first subband to the second subband in accordance with the designated frequency hopping pattern, via the second subband for a second time period, wherein the designated frequency hopping pattern indicates the first time period for communicating via the first subband, the second time period for communicating via the second subband, and an order for switching between the first subband and the second subband.

Aspect 4: The method of any of aspects 1 through 2, wherein communicating via the first subband and the second subband comprises: communicating via the first subband for a first quantity of transmission occasions based on a first periodicity associated with the first subband; and communicating, based on a switch from the first subband to the second subband in accordance with the designated frequency hopping pattern, via the second subband for a second quantity of transmission occasions based on a second periodicity associated with the second subband, wherein the first control message configures a respective periodicity for each subband of the two or more subbands within the BWP, and wherein the designated frequency hopping pattern indicates the first periodicity, the second periodicity, and an order for switching between the first subband and the second subband.

Aspect 5: The method of any of aspects 1 through 4, further comprising: receiving, via the first control message, a plurality of grant configurations, wherein each grant configuration of the plurality of grant configurations indicates a frequency domain allocation of a respective subband of the two or more subbands within the BWP and a time period associated with the respective grant configuration, and wherein each frequency hopping pattern of the set of one or more frequency hopping patterns indicates a respective order for switching between individual subbands of the two or more subbands in accordance with respective grant configurations corresponding to the individual subbands.

Aspect 6: The method of aspect 5, wherein communicating via the first subband and the second subband comprises communicating via the first subband for a first quantity of transmission occasions based on a first grant configuration of the plurality of grant configurations associated with the first subband; and communicating, based on a switch from the first subband to the second subband in accordance with the designated frequency hopping pattern, via the second subband for a second quantity of transmission occasions based on a second grant configuration of the plurality of grant configurations associated with the second subband.

Aspect 7: The method of aspect 6, wherein the switch is based on respective time periods associated with the first grant configuration and the second grant configuration, based on reception of downlink control information that activates the second grant configuration, or both.

Aspect 8: The method of any of aspects 1 through 7, further comprising: receiving, via the first control message, a mapping between each frequency hopping pattern of the set of one or more frequency hopping patterns and a respective subband of the two or more subbands; and receiving a second control message via a subband of the two or more subbands, wherein the second control message is indicative of the designated frequency hopping pattern based on the subband of the two or more subbands on which the second control message is received and based on the mapping.

Aspect 9: The method of any of aspects 1 through 8, further comprising: receiving, via the first control message, an indication of a subset of subbands of a plurality of subbands within the BWP configured for the first network node, wherein the first control message indicates that frequency hopping is activated within the subset of subbands and deactivated within remaining subbands of the plurality of subbands of the BWP.

Aspect 10: The method of any of aspects 1 through 9, wherein receiving the first control message comprises: receiving, as the first control message, an RRC message that configures a set of one or more grants for scheduling communications by the first network node and indicates a respective set of one or more frequency hopping patterns for each grant of the set of one or more grants.

Aspect 11: The method of aspect 10, wherein the RRC message indicates the designated frequency hopping pattern.

Aspect 12: The method of aspect 10, further comprising: receiving a MAC-CE that indicates a grant of the set of one or more grants and the designated frequency hopping pattern from among a set of one or more frequency hopping patterns associated with the grant, wherein the designated frequency hopping pattern is different than a default frequency hopping pattern indicated by the first control message; and communicating via at least two subbands of the two or more subbands in accordance with the designated frequency hopping pattern after a switch from the default frequency hopping pattern to the designated frequency hopping pattern based on the medium access control-control element.

Aspect 13: The method of aspect 10, further comprising: receiving DCI that activates a grant of the set of one or more grants and indicates the designated frequency hopping pattern from among the respective set of frequency hopping patterns indicated via the RRC message.

Aspect 14: The method of aspect 13, further comprising: receiving a MAC-CE that indicates a subset of frequency hopping patterns from among the respective sets of one or more frequency hopping patterns indicated via the RRC message, wherein the DCI indicates the designated frequency hopping pattern from among the subset of frequency hopping patterns indicated via the MAC-CE.

Aspect 15: The method of any of aspects 10 through 14, wherein the set of one or more grants comprises configured grants, SPS grants, DCI grants for uplink shared channels, downlink control information grants for downlink shared channels, or any combination thereof.

Aspect 16: A method for wireless communication at a first network node, comprising: transmitting a first control message that indicates a set of one or more frequency hopping patterns for switching between two or more subbands within a BWP configured for a second network node in communication with the first network node; and communicating via a first subband of the two or more subbands and via a second subband of the two or more subbands in accordance with a designated frequency hopping pattern from among the set of one or more frequency hopping patterns.

Aspect 17: The method of aspect 16, further comprising: transmitting a second control message that is indicative of the designated frequency hopping pattern from among the set of one or more frequency hopping patterns indicated via the first control message.

Aspect 18: The method of any of aspects 16 through 17, wherein communicating via the first subband and the second subband comprises: communicating via the first subband for a first time period; and communicating, based on a switch from the first subband to the second subband in accordance with the designated frequency hopping pattern, via the second subband for a second time period, wherein the designated frequency hopping pattern indicates the first time period for communicating via the first subband, the second time period for communicating via the second subband, and an order for switching between the first subband and the second subband.

Aspect 19: The method of any of aspects 16 through 17, wherein communicating via the first subband and the second subband comprises: communicating via the first subband for a first quantity of transmission occasions based on a first periodicity associated with the first subband; and communicating, based on a switch from the first subband to the second subband in accordance with the designated frequency hopping pattern, via the second subband for a second quantity of transmission occasions based on a second periodicity associated with the second subband, wherein the first control message configures a respective periodicity for each subband of the two or more subbands within the BWP, and wherein the designated frequency hopping pattern indicates the first periodicity, the second periodicity, and an order for switching between the first subband and the second subband.

Aspect 20: The method of any of aspects 16 through 19, further comprising: transmitting, via the first control message, a plurality of grant configurations, wherein each grant configuration of the plurality of grant configurations indicates a frequency domain allocation of a respective subband of the two or more subbands within the BWP and a time period associated with the respective grant configuration, and wherein each frequency hopping pattern of the set of one or more frequency hopping patterns indicates a respective order for switching between individual subbands of the two or more subbands in accordance with respective grant configurations corresponding to the individual subbands.

Aspect 21: The method of aspect 20, wherein communicating via the first subband and the second subband comprises: communicating via the first subband for a first quantity of transmission occasions based on a first grant configuration of the plurality of grant configurations associated with the first subband; and communicating, based on a switch from the first subband to the second subband in accordance with the designated frequency hopping pattern, via the second subband for a second quantity of transmission occasions based on a second grant configuration of the plurality of grant configurations associated with the second subband.

Aspect 22: The method of any of aspects 16 through 21, further comprising: transmitting, via the first control message, a mapping between each frequency hopping pattern of the set of one or more frequency hopping patterns and a respective subband of the two or more subbands; and transmitting a second control message via a subband of the two or more subbands, wherein the second control message is indicative of the designated frequency hopping pattern based on the subband of the two or more subbands on which the second control message is transmitted and based on the mapping.

Aspect 23: The method of any of aspects 16 through 22, further comprising: transmitting, via the first control message, an indication of a subset of subbands of a plurality of subbands within the BWP, wherein the first control message indicates that frequency hopping is activated within the subset of subbands and deactivated within remaining subbands of the plurality of subbands of the BWP.

Aspect 24: The method of any of aspects 16 through 23, wherein transmitting the first control message comprises: transmitting, as the first control message, an RRC message that configures a set of one or more grants for scheduling communications by the first network node and indicates a respective set of one or more frequency hopping patterns for each grant of the set of one or more grants.

Aspect 25: The method of aspect 24, wherein the RRC message indicates the designated frequency hopping pattern.

Aspect 26: The method of aspect 24, further comprising: transmitting a MAC-CE that indicates a grant of the set of one or more grants and the designated frequency hopping pattern from among a set of one or more frequency hopping patterns associated with the grant, wherein the designated frequency hopping pattern is different than a default frequency hopping pattern indicated by the first control message; and communicating via at least two subbands of the two or more subbands in accordance with the designated frequency hopping pattern after a switch from the default frequency hopping pattern to the designated frequency hopping pattern based on the MAC-CE.

Aspect 27: The method of aspect 24, further comprising: transmitting DCI that activates a grant of the set of one or more grants and indicates the designated frequency hopping pattern from among the respective set of frequency hopping patterns indicated via the RRC message.

Aspect 28: The method of aspect 27, further comprising: transmitting a MAC-CE that indicates a subset of frequency hopping patterns from among the respective sets of one or more frequency hopping patterns indicated via the RRC message, wherein the DCI indicates the designated frequency hopping pattern from among the subset of frequency hopping patterns indicated via the MAC-CE.

Aspect 29: A first network node, comprising a memory; and at least one processor coupled to the memory, wherein the at least one processor is configured to perform a method of any of aspects 1 through 15.

Aspect 30: An apparatus for wireless communication at a first network node, comprising at least one means for performing a method of any of aspects 1 through 15.

Aspect 31: A non-transitory computer-readable medium storing code for wireless communication at a first network node, the code comprising instructions executable by a processor to perform a method of any of aspects 1 through 15.

Aspect 32: A first network node, comprising a memory; and at least one processor coupled to the memory, wherein the at least one processor is configured to perform a method of any of aspects 16 through 28.

Aspect 33: An apparatus for wireless communication at a first network node, comprising at least one means for performing a method of any of aspects 16 through 28.

Aspect 34: A non-transitory computer-readable medium storing code for wireless communication at a first network node, the code comprising instructions executable by a processor to perform a method of any of aspects 16 through 28.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other aspects and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network entity for wireless communication, comprising:
a memory; and
at least one processor coupled to the memory, wherein the at least one processor is configured to:
receive a first control message that indicates a set of one or more frequency hopping patterns for switching between two or more subbands that are included within a bandwidth part configured for the first network entity;
communicate via a first subband of the two or more subbands for a first quantity of transmission occasions based on a first periodicity associated with the first subband, the first subband included within the bandwidth part, wherein a first size of the first subband is less than a second size of the bandwidth part within a frequency domain; and
communicate, based on a switch from the first subband to a second subband in accordance with a designated frequency hopping pattern from among the set of one or more frequency hopping patterns, via the second subband of the two or more subbands for a second quantity of transmission occasions based on a second periodicity associated with the second subband, the second subband included within the bandwidth part, wherein a third size of the second subband is less than the second size of the bandwidth part within the frequency domain, wherein the first control message configures a respective periodicity for each subband of the two or more subbands within the bandwidth part, and wherein the designated frequency hopping pattern indicates the first periodicity, the second periodicity, and an order for switching between the first subband and the second subband.

2. The first network entity of claim 1, wherein the at least one processor is configured to:
receive a second control message that is indicative of the designated frequency hopping pattern from among the set of one or more frequency hopping patterns indicated via the first control message.

3. The first network entity of claim 1, wherein, to communicate via the first subband and the second subband, the at least one processor is configured to:
communicate via the first subband for a first time period; and
communicate via the second subband for a second time period, wherein the designated frequency hopping pattern indicates the first time period for communicating via the first subband, the second time period for communicating via the second subband, and an order for switching between the first subband and the second subband.

4. The first network entity of claim 1, wherein the at least one processor is configured to:
receive, via the first control message, a plurality of grant configurations, wherein each grant configuration of the plurality of grant configurations indicates a frequency domain allocation of a respective subband of the two or more subbands within the bandwidth part and a time period associated with each grant configuration, and wherein each frequency hopping pattern of the set of one or more frequency hopping patterns indicates a respective order for switching between individual subbands of the two or more subbands in accordance with respective grant configurations corresponding to the individual subbands.

5. The first network entity of claim 4, wherein, to communicate via the first subband and the second subband, the at least one processor is configured to:
communicate via the first subband for a first quantity of transmission occasions based on a first grant configuration of the plurality of grant configurations associated with the first subband; and
communicate via the second subband for a second quantity of transmission occasions based on a second grant configuration of the plurality of grant configurations associated with the second subband.

6. The first network entity of claim 5, wherein the switch is based on respective time periods associated with the first grant configuration and the second grant configuration, based on reception of downlink control information that activates the second grant configuration, or both.

7. The first network entity of claim 1, wherein the at least one processor is configured to:
receive, via the first control message, a mapping between each frequency hopping pattern of the set of one or more frequency hopping patterns and a respective subband of the two or more subbands; and
receive a second control message via a subband of the two or more subbands, wherein the second control message is indicative of the designated frequency hopping pattern based on the subband of the two or more subbands on which the second control message is received and based on the mapping.

8. The first network entity of claim 1, wherein the at least one processor is configured to:
receive, via the first control message, an indication of a subset of subbands of a plurality of subbands within the bandwidth part configured for the first network entity, wherein the first control message indicates that frequency hopping is activated within the subset of subbands and deactivated within remaining subbands of the plurality of subbands of the bandwidth part.

9. The first network entity of claim 1, wherein the at least one processor is configured to:
receive, as the first control message, a radio resource control message that configures a set of one or more grants for scheduling communications by the first network entity and indicates a respective set of one or more frequency hopping patterns for each grant of the set of one or more grants.

10. The first network entity of claim 9, wherein the radio resource control message indicates the designated frequency hopping pattern.

11. The first network entity of claim 9, wherein the at least one processor is configured to:
receive a medium access control-control element that indicates a grant of the set of one or more grants and the designated frequency hopping pattern from among a set of one or more frequency hopping patterns associated with the grant, wherein the designated frequency hopping pattern is different than a default frequency hopping pattern indicated by the first control message; and
communicate via at least two subbands of the two or more subbands in accordance with the designated frequency hopping pattern after a switch from the default frequency hopping pattern to the designated frequency hopping pattern based on the medium access control-control element.

12. The first network entity of claim 9, wherein the at least one processor is configured to:
receive downlink control information that activates a grant of the set of one or more grants and indicates the designated frequency hopping pattern from among the respective set of one or more frequency hopping patterns indicated via the radio resource control message.

13. The first network entity of claim 12, wherein the at least one processor is configured to:
receive a medium access control-control element that indicates a subset of frequency hopping patterns from among the respective sets of one or more frequency hopping patterns indicated via the radio resource control message, wherein the downlink control information indicates the designated frequency hopping pattern from among the subset of frequency hopping patterns indicated via the medium access control-control element.

14. The first network entity of claim 9, wherein the set of one or more grants comprises configured grants, semi-persistent scheduling grants, downlink control information grants for uplink shared channels, downlink control information grants for downlink shared channels, or any combination thereof.

15. A first network entity for wireless communication, comprising:
a memory; and
at least one processor coupled to the memory, wherein the at least one processor is configured to:

transmit a first control message that indicates a set of one or more frequency hopping patterns for switching between two or more subbands that are included within a bandwidth part configured for the first network entity;

communicate via a first subband of the two or more subbands for a first quantity of transmission occasions based on a first periodicity associated with the first subband, the first subband included within the bandwidth part, wherein a first size of the first subband is less than a second size of the bandwidth part within a frequency domain; and communicate, based on a switch from the first subband to a second subband in accordance with a designated frequency hopping pattern from among the set of one or more frequency hopping patterns, via the second subband of the two or more subbands for a second quantity of transmission occasions based on a second periodicity associated with the second subband, the second subband included within the bandwidth part, wherein a third size of the second subband is less than the second size of the bandwidth part within the frequency domain, wherein the first control message configures a respective periodicity for each subband of the two or more subbands within the bandwidth part, and wherein the designated frequency hopping pattern indicates the first periodicity, the second periodicity, and an order for switching between the first subband and the second subband.

16. The first network entity of claim 15, wherein the at least one processor is configured to:
transmit a second control message that is indicative of the designated frequency hopping pattern from among the set of one or more frequency hopping patterns indicated via the first control message.

17. The first network entity of claim 15, wherein, to communicate via the first subband and the second subband, the at least one processor is configured to:
communicate via the first subband for a first time period; and
communicate via the second subband for a second time period, wherein the designated frequency hopping pattern indicates the first time period for communicating via the first subband, the second time period for communicating via the second subband.

18. The first network entity of claim 15, wherein the at least one processor is configured to:
transmit, via the first control message, a plurality of grant configurations, wherein each grant configuration of the plurality of grant configurations indicates a frequency domain allocation of a respective subband of the two or more subbands within the bandwidth part and a time period associated with each grant configuration, and wherein each frequency hopping pattern of the set of one or more frequency hopping patterns indicates a respective order for switching between individual subbands of the two or more subbands in accordance with respective grant configurations corresponding to the individual subbands.

19. The first network entity of claim 18, wherein, to communicate via the first subband and the second subband, the at least one processor is configured to:
communicate via the first subband for a first quantity of transmission occasions based on a first grant configuration of the plurality of grant configurations associated with the first subband; and
communicate via the second subband for a second quantity of transmission occasions based on a second grant configuration of the plurality of grant configurations associated with the second subband.

20. The first network entity of claim 15, wherein the at least one processor is configured to:
transmit, via the first control message, a mapping between each frequency hopping pattern of the set of one or more frequency hopping patterns and a respective subband of the two or more subbands; and
transmit a second control message via a subband of the two or more subbands, wherein the second control message is indicative of the designated frequency hopping pattern based on the subband of the two or more subbands on which the second control message is transmitted and based on the mapping.

21. The first network entity of claim 15, wherein the at least one processor is configured to:
transmit, via the first control message, an indication of a subset of subbands of a plurality of subbands within the bandwidth part, wherein the first control message indicates that frequency hopping is activated within the subset of subbands and deactivated within remaining subbands of the plurality of subbands of the bandwidth part.

22. The first network entity of claim 15, wherein the at least one processor is configured to:
transmit, as the first control message, a radio resource control message that configures a set of one or more grants for scheduling communications by the first network entity and indicates a respective set of one or more frequency hopping patterns for each grant of the set of one or more grants.

23. The first network entity of claim 22, wherein the radio resource control message indicates the designated frequency hopping pattern.

24. The first network entity of claim 22, wherein the at least one processor is configured to:
transmit a medium access control-control element that indicates a grant of the set of one or more grants and the designated frequency hopping pattern from among a set of one or more frequency hopping patterns associated with the grant, wherein the designated frequency hopping pattern is different than a default frequency hopping pattern indicated by the first control message; and
communicate via at least two subbands of the two or more subbands in accordance with the designated frequency hopping pattern after a switch from the default frequency hopping pattern to the designated frequency hopping pattern based on the medium access control-control element.

25. The first network entity of claim 22, wherein the at least one processor is configured to:
transmit downlink control information that activates a grant of the set of one or more grants and indicates the designated frequency hopping pattern from among the respective set of one or more frequency hopping patterns indicated via the radio resource control message.

26. The first network entity of claim 25, wherein the at least one processor is configured to:
transmit a medium access control-control element that indicates a subset of frequency hopping patterns from among the respective sets of one or more frequency hopping patterns indicated via the radio resource control message, wherein the downlink control information indicates the designated frequency hopping pattern from among the subset of frequency hopping patterns indicated via the medium access control-control element.

27. A method for wireless communication at a first network entity, comprising:
   receiving a first control message that indicates a set of one or more frequency hopping patterns for switching between two or more subbands that are included within a bandwidth part configured for the first network entity;
   communicating via a first subband of the two or more subbands for a first quantity of transmission occasions based on a first periodicity associated with the first subband, the first subband included within the bandwidth part, wherein a first size of the first subband is less than a second size of the bandwidth part within a frequency domain; and
   communicating, based on a switch from the first subband to a second subband in accordance with a designated frequency hopping pattern from among the set of one or more frequency hopping patterns, via the second subband of the two or more subbands for a second quantity of transmission occasions based on a second periodicity associated with the second subband, the second subband included within the bandwidth part, wherein a third size of the second subband is less than the second size of the bandwidth part within the frequency domain, wherein the first control message configures a respective periodicity for each subband of the two or more subbands within the bandwidth part, and wherein the designated frequency hopping pattern indicates the first periodicity, the second periodicity, and an order for switching between the first subband and the second subband.

28. A method for wireless communication at a first network entity, comprising:
   transmitting a first control message that indicates a set of one or more frequency hopping patterns for switching between two or more subbands that are included within a bandwidth part configured for the first network entity;
   communicating via a first subband of the two or more subbands for a first quantity of transmission occasions based on a first periodicity associated with the first subband, the first subband included within the bandwidth part, wherein a first size of the first subband is less than a second size of the bandwidth part within a frequency domain; and
   communicating, based on a switch from the first subband to a second subband in accordance with a designated frequency hopping pattern from among the set of one or more frequency hopping patterns, via the second subband of the two or more subbands for a second quantity of transmission occasions based on a second periodicity associated with the second subband, the second subband included within the bandwidth part, wherein a third size of the second subband is less than the second size of the bandwidth part within the frequency domain, wherein the first control message configures a respective periodicity for each subband of the two or more subbands within the bandwidth part, and wherein the designated frequency hopping pattern indicates the first periodicity, the second periodicity, and an order for switching between the first subband and the second subband.

* * * * *